United States Patent
Gunnarsson et al.

(10) Patent No.: US 12,137,403 B2
(45) Date of Patent: Nov. 5, 2024

(54) RADIO NETWORK NODE, A WIRELESS DEVICE AND METHODS THEREIN FOR SCHEDULING POSITIONING SYSTEM INFORMATION BLOCK (SIB)

(71) Applicant: Telefonaktiebolaget LM Ericsson (publ), Stockholm (SE)

(72) Inventors: Fredrik Gunnarsson, Linköping (SE); Håkan Palm, Växjö (SE); Ritesh Shreevastav, Upplands Väsby (SE); Sara Modarres Razavi, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 900 days.

(21) Appl. No.: 17/432,294

(22) PCT Filed: May 8, 2019

(86) PCT No.: PCT/SE2019/050407
§ 371 (c)(1),
(2) Date: Aug. 19, 2021

(87) PCT Pub. No.: WO2019/216813
PCT Pub. Date: Nov. 14, 2019

(65) Prior Publication Data
US 2022/0182920 A1   Jun. 9, 2022

Related U.S. Application Data
(60) Provisional application No. 62/668,885, filed on May 9, 2018.

(51) Int. Cl.
*H04W 48/10* (2009.01)
*H04L 5/00* (2006.01)
(Continued)

(52) U.S. Cl.
CPC .......... *H04W 48/10* (2013.01); *H04L 5/0048* (2013.01); *H04W 48/12* (2013.01); *H04W 64/003* (2013.01); *H04W 72/0446* (2013.01)

(58) Field of Classification Search
CPC ... H04W 48/10; H04W 48/12; H04W 64/003; H04W 72/0446; H04W 64/00;
(Continued)

(56) References Cited

U.S. PATENT DOCUMENTS

| 9,516,621 B2* | 12/2016 | Bialer | G01S 19/396 |
| 11,019,487 B2* | 5/2021 | Edge | H04W 12/04 |

(Continued)

FOREIGN PATENT DOCUMENTS

| CN | 104780020 A | 7/2015 |
| CN | 106464270 A | 2/2017 |
| CN | 107925953 A | 4/2018 |

OTHER PUBLICATIONS

Unknown, Author, "Further Details on Broadcast of Assistance Data", 3GPP TSG-RAN WG2 Meeting #101, R2-1803394, Qualcomm Incorporated, Athens, Greece, Feb. 26-Mar. 2, 2018, 11 pages.
(Continued)

*Primary Examiner* — Brian T O Connor
(74) *Attorney, Agent, or Firm* — Weisberg I.P. Law, P.A.

(57) ABSTRACT

A wireless device 10,120 and a method performed therein for receiving scheduled positioning system information from a radio network node 20, 110. The wireless device and the radio network node operate in a wireless communications network 100. The wireless device receives, from the radio network node, positioning system information scheduling information (pSI) and at least one out of a scheduling offset and a number of system information messages with positioning system information blocks (pSIMs) per system information (SI) window. Further, the wireless device deter-
(Continued)

Different means of densified scheduling mines in which subframes one or more pSIMs are scheduled by the radio network node based on the pSI and based on at least one out of the scheduling offset and the number of pSIMs per SI window. Furthermore, the wireless device uses the determined scheduling of the one or more pSIMs for receiving the one or more pSIMs.

14 Claims, 12 Drawing Sheets

(51) Int. Cl.
*H04W 48/12* (2009.01)
*H04W 64/00* (2009.01)
*H04W 72/0446* (2023.01)

(58) Field of Classification Search
CPC ............... H04W 72/30; H04W 12/037; H04W 72/1263; H04W 72/51; H04L 5/0048; G01S 5/0236
See application file for complete search history.

(56) References Cited

U.S. PATENT DOCUMENTS

| | | | | |
|---|---|---|---|---|
| 11,067,697 | B2* | 7/2021 | Boudaud | G01S 19/258 |
| 11,425,685 | B2* | 8/2022 | Gunnarsson | H04W 12/037 |
| 11,641,686 | B2* | 5/2023 | Babu | H04W 76/15 |
| | | | | 370/328 |
| 11,696,122 | B2* | 7/2023 | Edge | H04W 64/00 |
| | | | | 726/4 |
| 11,785,619 | B2* | 10/2023 | Gunnarsson | H04W 12/037 |
| | | | | 370/329 |
| 2014/0293860 | A1 | 10/2014 | Hegde | |
| 2016/0007377 | A1 | 1/2016 | Frenne et al. | |
| 2021/0282006 | A1* | 9/2021 | Edge | H04W 52/0225 |
| 2023/0388783 | A1* | 11/2023 | Edge | H04W 12/02 |
| 2023/0413297 | A1* | 12/2023 | Gunnarsson | H04W 72/1263 |

OTHER PUBLICATIONS

3GPP, "3GPP TS 36.331 V14.6.2", 3rd Generation Partnership Project; Technical Specification Group Radio Access Network; Evolved Universal Terrestrial Radio Access (E-UTRA); Radio Resource Control (RRC); Protocol specification (Release 14), Apr. 2018, 1-766.

Author Unknown, "Resource allocation in frequency domain", TP section 5.1.2.2 of 38.214 from agenda point 7.3.1.4, 2018, 1-7.

Ericsson, "On positioning SIB scheduling", 3GPP TSG-RAN WG2 #102, R2-1808749 (Late resubmission of R2-1808113), Busan, Korea, May 21-25, 2018, 1-7.

Ericsson, "Positioning assistance data segmentation and grouping", 3GPP TSG-RAN WG2 #101bis, R2-1805257, Sanya, China, Apr. 16-20, 2018, 1-5.

Ericsson, "Scheduling multiple SI messages in a single window", 3GPP TSG-RAN WG2#101, Tdoc R2-1803120 (revision of R2-180287), Athens, Greece, Feb. 26-Mar. 2, 2018, 1-3.

Qualcomm Incorporated, "Addition of broadcast of positioning in assistance data", 3GPP TSG-RAN WG2 Meeting #101bis, R2-1804787, Sanya, China, Apr. 16-20, 2018, 1-5.

Unknown, Author, "Positioning assistance data segmentation and grouping", 3GPP TSG.RAN WG2 #101 bis, R2-1805255, Ericsson, Sanya, China, Apr. 16-20, 2018, 7 pages.

Chinese Office Action and Search Report with English machine translation dated May 25, 2023 for Patent Application No. 201980046193.5, consisting of 12-pages.

Ericsson, "On positioning SIB scheduling", 3GPP TSG-RAN WG2 #102, R2-1808113, Busan, Korea,, May 21-25, 2018, 1-7.

Huawei, et al., "ASN. 1 for the PRACH resource of on-demand SI request", 3GPP TSG-RAN WG2 Meeting 101bis, R2-1805232, Sanya, China, Apr. 16-20, 2018, 1-5.

* cited by examiner

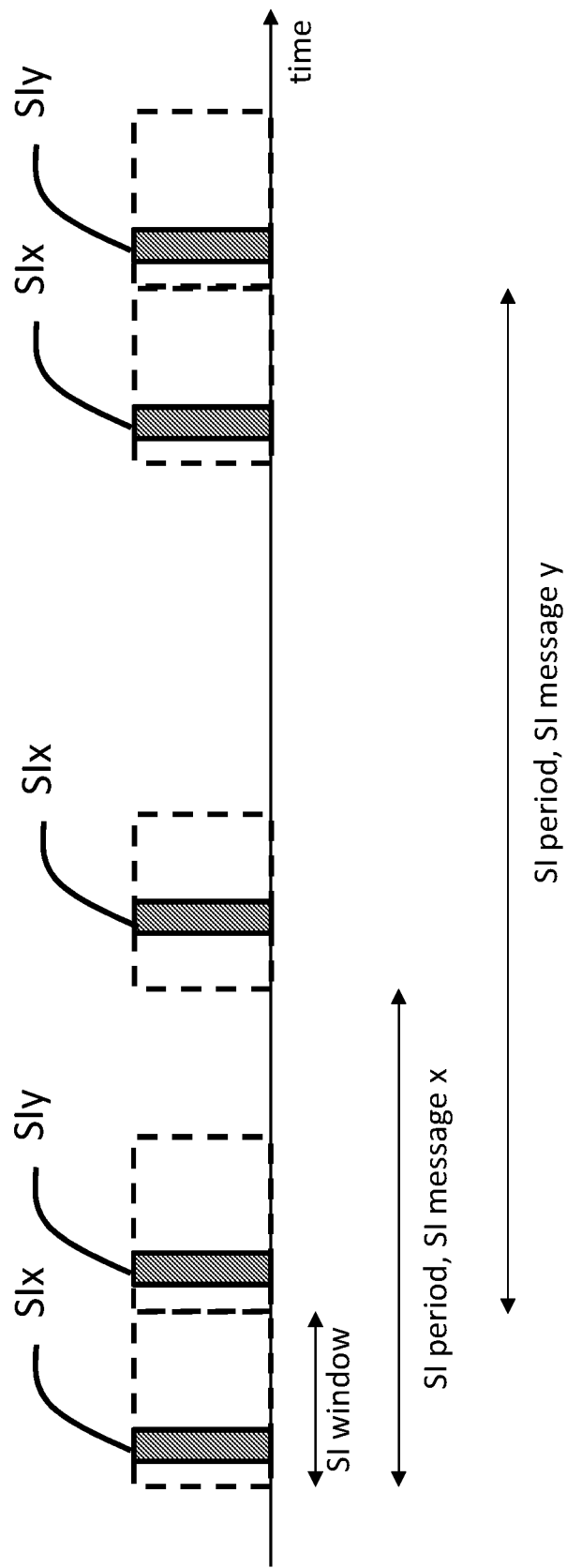
Fig. 1B Legacy SI message scheduling

Fig. 4 Method performed by wireless device 10,120

Fig. 6 Method performed by radio network node 20,110

Fig. 8 Different means of densified scheduling

RADIO NETWORK NODE, A WIRELESS DEVICE AND METHODS THEREIN FOR SCHEDULING POSITIONING SYSTEM INFORMATION BLOCK (SIB)

TECHNICAL FIELD

Embodiments herein relate to a radio network node, a wireless device and to methods therein. Especially, embodiments relate to scheduling of positioning System Information Block (SIB).

BACKGROUND

In a typical wireless communication network, wireless devices, also known as wireless communication devices, mobile stations, stations (STA) and/or User Equipments (UEs), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Positioning in an LTE communications network is supported by the architecture schematically illustrated in FIG. 1A, with direct interactions between a UE and a location server, e.g. an Enhanced Serving Mobile Location Center (E-SMLC), via the LTE Positioning Protocol (LPP). Moreover, there are also interactions between the location server and an eNodeB via the LPPa protocol, to some extent supported by interactions between the eNodeB and the UE via the Radio Resource Control (RRC) protocol.

UE positioning is recognized as an important feature for LTE networks due to its potential for massive commercial applications (for example intelligent transportation, entertainment, industry automation, robotics, remote operation, healthcare, smart parking and so on) as well as its relevance to US Federal Communications Commission (FCC) Enhanced 991 (E911) requirements.

LTE networks have support for a wide range of positioning methods. The Global Navigation Satellites System (GNSS) is one of the widely used positioning methods and is a collective term for many different satellite systems, with the Global Positioning System (GPS) being the most commonly supported by devices, GLONASS, Galileo, BeiDou, and QZSS are other examples. Furthermore, satellite systems may also be used to provide augmentation data to the UE, commonly referred to as Satellite Based Augmentation Systems (SBAS).

Recent enhancements in the GNSS technology include support for very precise positioning, where a device, e.g. a UE, may interact with a network node to obtain specific measurement correction information. Much of these are captured by the specification work of Radio Technical Commission for Maritime Services (RTCM). One example is Real Time Kinematic (RTK) GNSS, which is a differential GNSS positioning technology enabling improvement in the positioning accuracy from meter level to decimeter or even centimeter level in the right conditions in real-time by exploiting carrier phase measurements of the GNSS signal from individual satellites, rather than only the code phase, together with assistance data based on information from one or more reference stations. Support for the RTK GNSS in LTE networks should therefore be provided and are under standardization in the 3GPP Release 15 work item. The support for UE-based GNSS RTK in the LTE networks comprises reporting RTK assistance data to the UE. The assistance data may also encompass other kinds of positioning assistance data, such as more general assisted GNSS, OTDOA information, etc.

Two options for providing positioning assistance data to the UE are being standardized. The first option is to broadcast the positioning assistance data from radio network nodes, such as base stations, by extending the system information with positioning system information. The second option is to send the positioning assistance data to each UE individually via unicast, for example via the LPP. In addition, the UE may also interact with an RTK server over the application layer directly, as another example of unicast.

For broadcast, the positioning assistance data may be separated into different positioning assistance data parts, or positioning System Information Block (pSIB) types. The location server prepares the positioning assistance data parts, encodes them separately and optionally encrypts them individually and sends them to the radio network node, such as the base station. The positioning assistance data parts are mapped to the pSIBs. One or more pSIBs can be broadcasted by the radio network node, such as the base station, in an SI message with pSIBs (pSIM). Thus, a pSIM is an SI message comprising one or more pSIBs. If the pSIB is too large to fit into a single SI message, it may be segmented in a network node NN, either after encoding e.g. after octet string segmentation, or the network node NN may segment the positioning assistance data part into multiple segment before encoding, e.g. pseudo segmentation. In these cases, the segments are mapped to the same pSIB type, but indicated as different segments.

In current system information broadcast, the scheduling information is also broadcasted. For each SI message containing one or more SIBs, the radio network node, such as the base station, configures an SI periodicity, while the SI window is the same for all SIBs. The device, e.g. the UE, retrieves an SI identifier which is used to identify a SIB among the transmitted data blocks within the SI window.

The current state of the art for positioning information broadcast is to configure an SI periodicity per SI message. In case a SIB is too large (only applicable for SIB12 of LTE for comprising the Commercial Mobile Alert System (CMAS) warnings), the SIB will be segmented, and each segment will be sent in separate SI periods, scheduled in separate SI windows, and separated in time by about the SI periodicity.

Moreover, only one SI message may be scheduled in each SI window as illustrated by FIG. 1B. FIG. 1B schematically illustrates the scheduling for SI messages x and y, where the SI message x period is half of the SI message y period. In FIG. 1B, the SI message x is denoted SIx and the SI message y is denoted SIy.

From the 3GPP RRC specification 36.331, section 5.2.3 a description of how to determine a start of the SI-window for an SI message is known:

1> determine the start of the SI-window for the concerned SI message as follows:
2> for the concerned SI message, determine the number n which corresponds to the order of entry in the list of SI messages configured by schedulingInfoList in SystemInformationBlockType1;
2> determine the integer value x=(n−1)*w, where w is the SI window length si-WindowLength;
2> the SI-window starts at the subframe #a, where a=x mod 10, in the radio frame for which a System Frame Number (SFN) mod T=FLOOR(x/10), where T is the si-Periodicity of the concerned SI message;
NOTE: E-UTRAN should configure an SI-window of 1 ms only if all SIs are scheduled before subframe #5 in radio frames for which SFN mod 2=0.

In LTE, the contents of a first SIB SIB1 may assist the UE when it is evaluating cell access and the SIB1 contents may also define the scheduling of other system information. With a SIB1 scheduled every 20 ms, and the remaining SIBs scheduled with periodicities of 80 ms and up, there will be many SI windows already scheduled. Given the restriction that only one SI message can be scheduled per SI window, the remaining resources for positioning SIBs are quite limited. In one typical example, the SI window length is 10 ms (w), the first SI message (n=1) is sent every 80 ms, and the second (n=2) every 160 ms.

The first SI window of the first SI message starts at subframe #a, where a=0 mod 10=0 in the radio frame for which SFN mod 8=0, i.e. the first SI message is broadcasted in SI windows of 10 ms that starts at SFN=0, 8, 16, . . .

The first SI window of the second SI message starts at subframe #a, where a=10 mod 10=0 in the radio frame for which SFN mod 16=1, i.e. the second SI message is broadcasted in SI windows of 10 ms that starts at SFN 1, 17, 33, . . .

For example, with a window length of 10 ms, only an additional six SI messages can be scheduled since the first messages in the suite all align up in the same time, in contiguous SI windows.

In legacy SI messages, the CMAS system information may be segmented. Since only one SIB type per SI periodicity is supported, the acquisition time can be quite long in case of long periodicities and multiple segments. Positioning SIBs can also be subject to segmentation, with several segments per assistance data element type, potentially inflicting a long acquisition time.

SUMMARY

One objective for the LTE Rel15 accurate positioning work item is to specify a new SIB to support broadcast of Assistance Data (AD). For example, the broadcasting of assistance data is discussed in the 3GPP technical specification groups Radio Access Network (RAN) layers 2 and 3: RAN2, and RAN3, and in the 3GPP technical specification groups on Service and System Aspects: SA3, and SA2. Further, work has to be performed to specify a new SIB to support signaling of positioning assistance information for A-GNSS, RTK and UE-based OTDOA assistance information; and to specify optional encryption procedure for broadcast assistance data, including mechanism for delivery of UE-specific encryption keys.

As a part of developing embodiments herein a problem will first be identified and discussed.

Extending the scheduling of legacy SI messages with scheduling of SI message with positioning SIBs (pSIM) will be critically resource limited, restricting the number of pSIMs that may be scheduled.

By the term "legacy" when used herein is meant the conventional procedure in which the SI message is being extended for a new scheduling.

An object of embodiments herein is therefore to improve the performance of a wireless communications network by improving scheduling of pSIB.

According to some embodiments disclosed herein a method for minimizing delay for SIB broadcast is provided. Further, according to some embodiments, one or more pSIMs, i.e. one or more SI messages comprising one or more pSIBs, are assumed to be subject to a specific positioning system information Scheduling Information (pSI), and that dedicated behavior is designed for the handling, scheduling and reception of the pSIMs. Especially, embodiments disclosed herein define scheduling extensions to increase the scheduling capacity of pSIMs.

An advantage of embodiments disclosed herein is that the capacity of pSIM scheduling is increased, allowing more positioning assistance data to be broadcasted. For example, more positioning assistance data may be broadcasted within an SI window, i.e. within a shorter period of time, as compared to the prior art. This results in that the transmission of pSIBs within the period of time is increased as compared to the prior art and thus that the delay in transmitting pSIBs is reduced as compared to the prior art.

According to an aspect of embodiments herein, the object is achieved by a method performed by a wireless device for receiving scheduled positioning system information from a radio network node. The wireless device and the radio network node operate in a wireless communications network.

The wireless device receives positioning system information Scheduling Information (pSI) from the radio network node.

Further, the wireless device receives, from the radio network node, at least one out of: a scheduling offset, and a number of system information messages with positioning system information blocks (pSIMs) per SI window.

Furthermore, the wireless device determines in which subframes one or more pSIMs are scheduled by the radio network node based on the pSI and based on at least one out of the scheduling offset and the number of pSIMs per SI window.

The wireless device uses the determined scheduling of the one or more pSIMs for receiving the one or more pSIMs.

According to another aspect of embodiments herein, the object is achieved by a wireless device for receiving scheduled positioning system information from a radio network node. The wireless device and the radio network node are configured to operate in a wireless communications network.

The wireless device is configured to receive positioning system information Scheduling Information (pSI) from the radio network node.

Further, the wireless device is configured to receive, from the radio network node, at least one out of: a scheduling offset and a number of system information messages with positioning system information blocks (pSIMs) per SI window.

Furthermore, the wireless device is configured to determine in which subframes one or more pSIMs are scheduled by the radio network node based on the pSI and based on at least one out of the scheduling offset and the number of pSIMs per SI window.

The wireless device is configured to use the determined scheduling of the one or more pSIMs for receiving the one or more pSIMs.

According to another aspect of embodiments herein, the object is achieved by a method performed by a radio network node for transmitting scheduled positioning system information to a wireless device. The radio network node and the wireless device operate in a wireless communications network.

The radio network node obtains one or more positioning System Information Blocks (pSIBs).

Further, the radio network node compiles one or more system information message with positioning system information blocks (pSIM) to comprise one or more pSIBs.

Furthermore, the radio network node determines positioning system information Scheduling Information (pSI) of the one or more pSIMs in consideration of at least one out of a scheduling offset and a number of pSIMs per SI window.

The radio network node broadcasts the determined pSI of the one or more pSIMs and the at least one out of the scheduling offset and the number of pSIMs.

Yet further, the radio network node schedules and transmits the one or more pSIMs according to the determined pSI.

According to another aspect of embodiments herein, the object is achieved by a radio network node for transmitting scheduled positioning system information to a wireless device. The radio network node and the wireless device are configured operate in a wireless communications network.

The radio network node is configured to obtain one or more positioning System Information Blocks (pSIBs).

Further, the radio network node is configured to compile one or more system information message with positioning system information blocks (pSIM) to comprise one or more pSIBs.

Furthermore, the radio network node is configured to determine positioning system information Scheduling Information (pSI) of the one or more pSIMs in consideration of at least one out of a scheduling offset and a number of pSIMs per SI window.

The radio network node is configured to broadcast the determined pSI of the one or more pSIMs and the at least one out of the scheduling offset and the number of pSIMs.

Yet further, the radio network node is configured to schedule and transmit the one or more pSIMs according to the determined pSI.

According to another aspect of embodiments herein, the object is achieved computer program comprises instructions, which when executed by at least one processor of the wireless device, cause the at least one processor of the wireless device to perform one or more of the actions described herein.

According to another aspect of embodiments herein, the object is achieved computer program comprises instructions, which when executed by at least one processor of the radio network node, cause the at least one processor of the radio network node to perform one or more of the actions described herein.

According to another aspect of embodiments herein, the object is achieved by a carrier comprising the respective computer program, wherein the carrier is one of an electronic signal, an optical signal, an electromagnetic signal, a magnetic signal, an electric signal, a radio signal, a microwave signal, or a computer-readable storage medium.

Since the radio network node is configured to determine the pSI of the one or more pSIMs in consideration of the at least one out of the scheduling offset and the number of pSIMs per SI window, since the radio network node is configured to broadcast the determined pSI of the one or more pSIMs and the at least one out of the scheduling offset and the number of pSIMs, and since the radio network node is configured to schedule and transmit the one or more pSIMs according to the determined pSI, the one or more pSIMs are broadcasted within a shorter period of time as compared to the prior art system thereby reducing the delay for transmitting pSIBs.

BRIEF DESCRIPTION OF THE DRAWINGS

Examples of embodiments herein are described in more detail with reference to attached drawings in which:

FIG. 1B schematically illustrates scheduling of SI message according to prior art;

DETAILED DESCRIPTION

Embodiments herein may refer to GNSS, RTK, Positioning, SIBs.

Figure 1A:
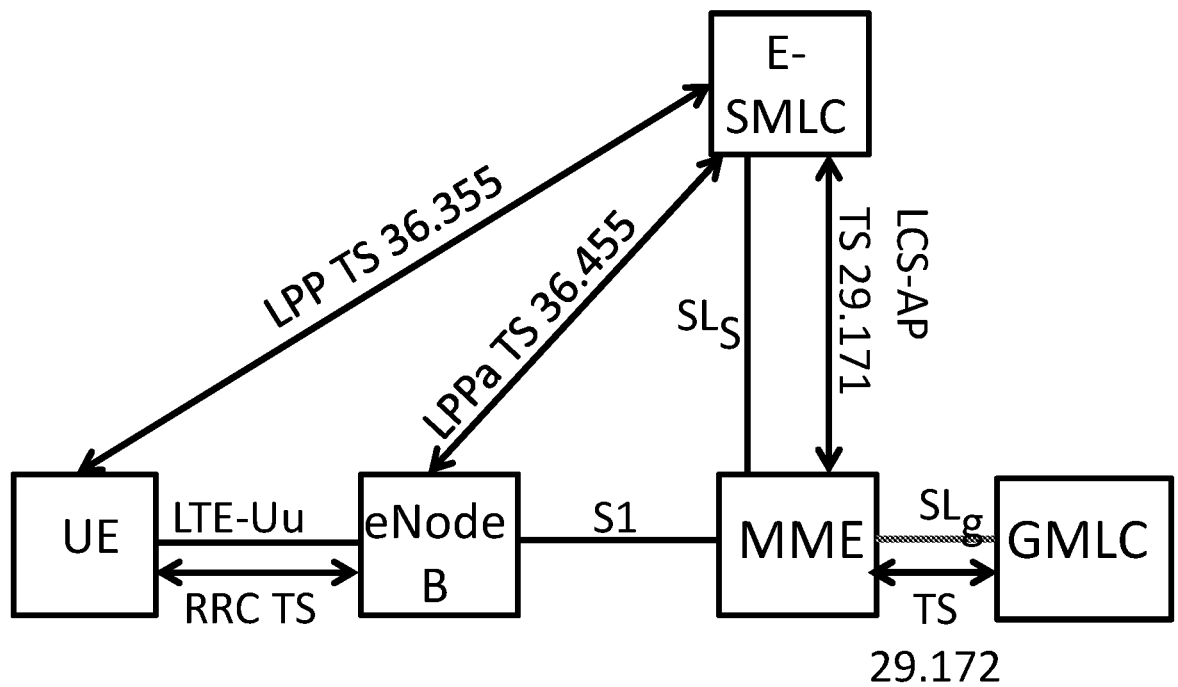
FIG. 1A is a schematic block diagram illustrating an LTE communications network supporting positioning according to prior art.
Figure 2:
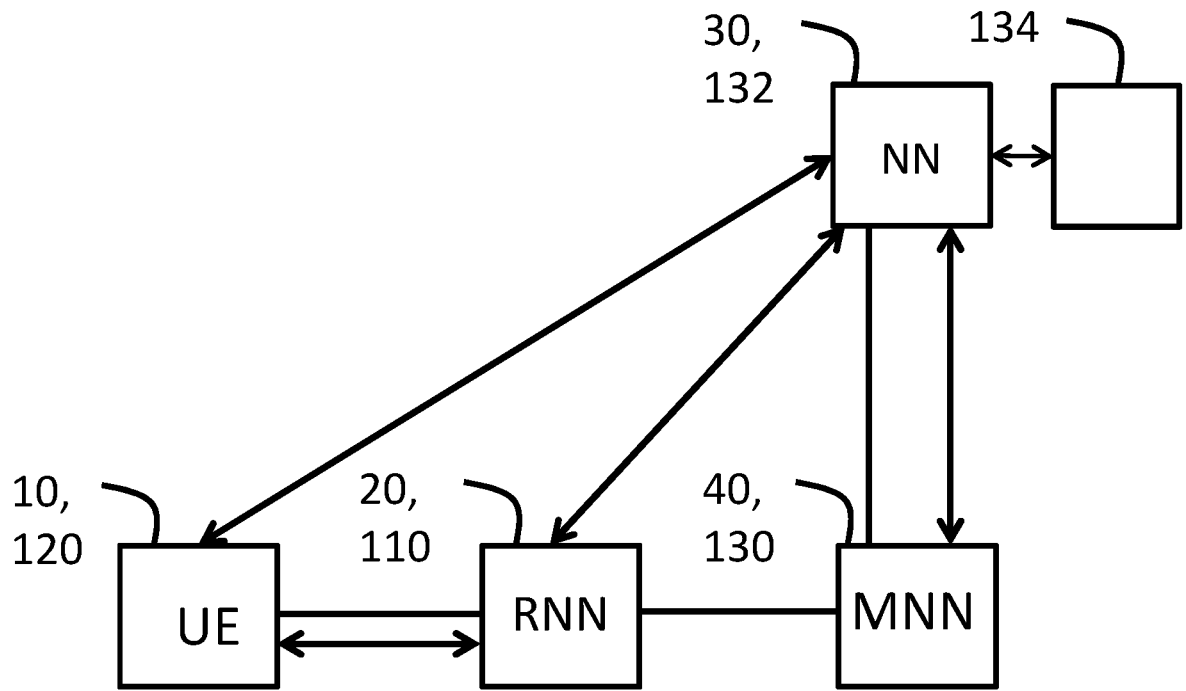
FIG. 2 is a schematic block diagram illustrating embodiments of a wireless communications network.

FIG. 2 schematically illustrates logical entities of a wireless communications network in more general terms. A target device or a UE 10,120 is the entity performing the positioning measurements supported by the positioning assistance data elements broadcasted as positioning SIBs (pSIBs) in SI messages by a Radio Network Node (RNN), typically a radio base station 20,110 but in even more general terms a transmission point, radio head, cell eNB, gNB etc. The broadcasted information is prepared by a network node (NN) 30,132, which may be a location server, an Enhanced Serving Mobile Location Center (E-SMLC), a Location Management Function (LMF), etc. Optionally, the positioning assistance data for broadcast may be ciphered/encrypted at the NN 30,132, in which case, decryption/deciphering keys are sent from the NN 30,132 to a Mobility Network Node (MNN) 40,130. The MNN 40,130 may be a Mobility Management Entity (MME) in EPC or an Access and Mobility Function (AMF) in the 5G core, or some other core network node. In case of encrypted data, the UE 10,120 obtains the decryption/deciphering keys from the MNN 40,130.

Embodiments herein are mostly exemplified with LTE wireless devices but it may be applicable to other wireless devices which are served by other Radio Access Technologies such as CAT-M, NB-IoT, WiFi, or NR Carriers.

Figure 3:
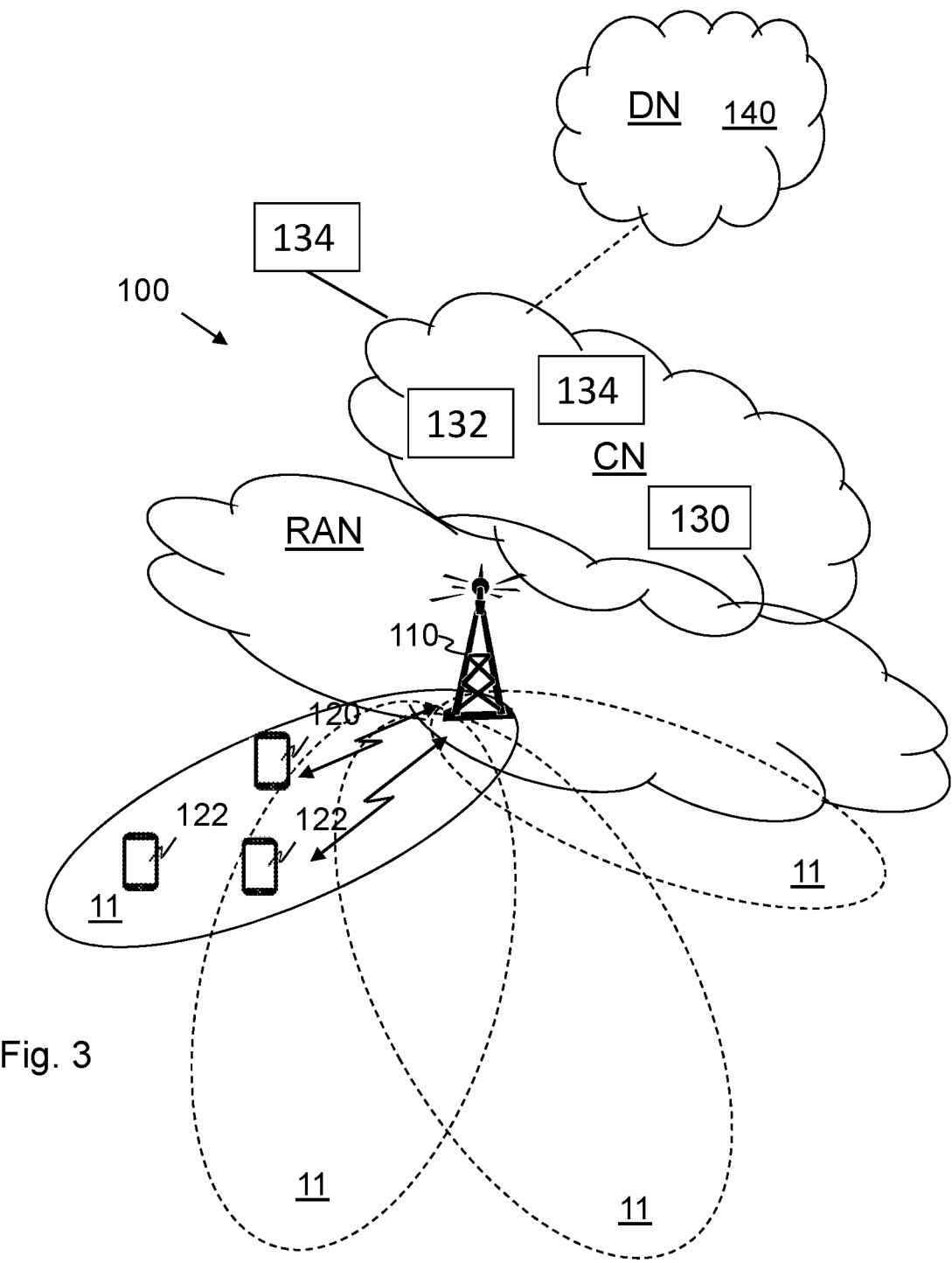
FIG. 3 is a schematic block diagram illustrating embodiments of a wireless communications network.

Embodiments herein relate to wireless communication networks in general. FIG. 3 is a schematic overview depicting a wireless communications network 100 wherein embodiments herein may be implemented. The wireless communications network 100 may be referred to as a radio communications network. The wireless communications network 100 comprises one or more Radio Access Networks (RANs) and one or more Core Networks (CNs). The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 100 is referred to as just a network.

Wireless devices e.g. a wireless device 10,120 also referred to as the first UE 120, is operating in the wireless communications network 100. One or more further wireless devices 122 also referred to as one or more second UEs 122 may operate in the wireless communications network 100. As schematically illustrated in FIG. 3, the wireless device 120,122 may communicate with a network node, e.g. a network node 110 which will be described below.

The wireless devices 120, 122 may each e.g. be a mobile station, a non-Access Point (non-AP) STA, a STA, a user equipment and/or a wireless terminals, an NB-IoT device, an enhanced Machine Type Communication (eMTC) device and a category M (CAT-M) device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Network nodes operate in the radio communications network 100, such as a Radio Network Node (RNN) 20,110 also referred to as the first network node 110. The network node 110, i.e. the radio network node 20, 110 provides radio coverage over one or more geographical areas, e.g. one or more service areas 11, which may also be referred to as cells, beams or beam groups of a first Radio Access Technology (RAT), such as 5G, LTE, Wi-Fi, NB-IoT, CAT-M, Wi-Fi, eMTC or similar. The network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110, i.e. by the radio network node 20, 110, depending e.g. on the radio access technology and terminology used. The network node 110, i.e. the radio network node 20, 110, may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a Mobility Network Node (MNN) 40,130 also referred to as the second network node 130. The network node 130 may be an MME which is a control node for an LTE access network, a Serving Gateway (SGW), and a Packet Data Network Gateway (PGW). An MME is amongst other responsible for tracking and paging procedure including retransmissions. Further, the network node 130 may be an Operation And Maintenance (OAM) node such as an Operation and Support System Radio and Core (OSS-RC) node or an Ericsson Network Management (ENM) node.

Further network nodes such as a location server 30, 132 and a positioning server 134 operate in the radio communications network 100. For example, the location server 30,132 may be an E-SMLC and the positioning server 134 may be an RTK server. The location server 132 and the positioning server 134 may communication with each other over a communications interface.

It should be understood that the positioning server 134 may be arranged external of the radio communications network 100 and in such a scenario the positioning server 134 may be referred to as an external positioning server 132 and the location server 132 and the positioning server 134 may communicate over an IP interface.

The positioning server 134 may sometimes herein be referred to as an RTK server or an RTK network provider.

Methods according to embodiments herein may be performed by any of the network node 110 such as e.g. an eNB, the wireless device 120, e.g. the UE, the mobility network node 130, the location server 132 and/or by the positioning server 134. As an alternative, a Distributed Node (DN) and functionality, e.g. comprised in a cloud 140 as shown in FIG. 3 may be used for performing or partly performing the methods.

Actions of Some Embodiments Herein

Figure 4:
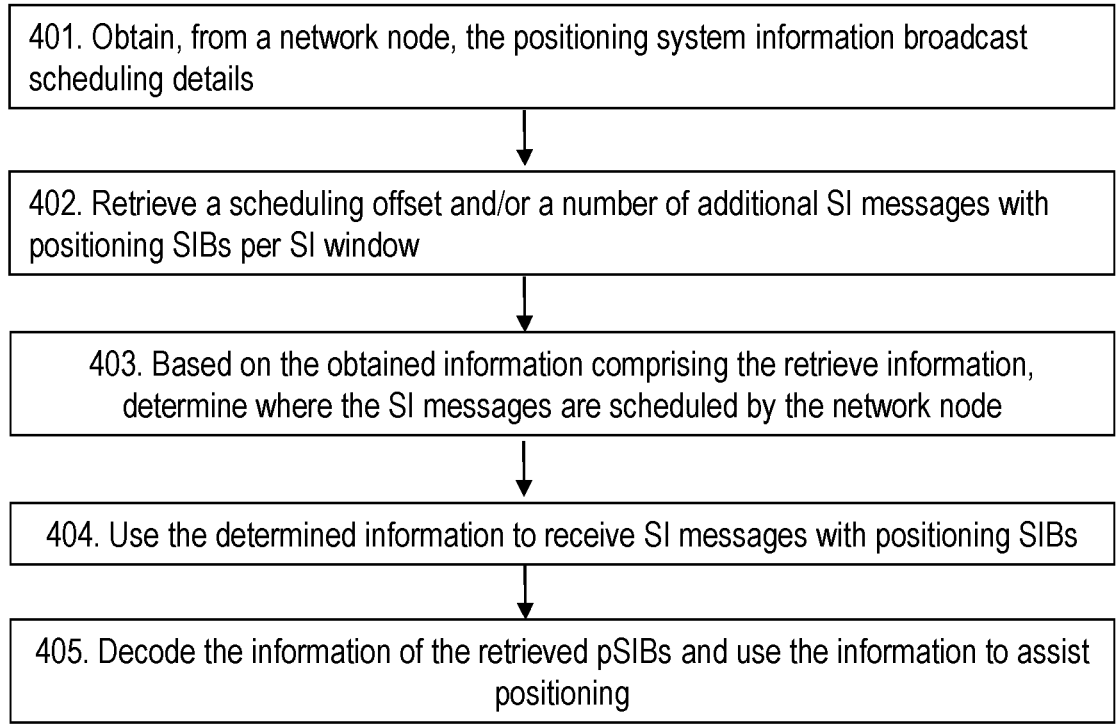
FIG. 4 is a flowchart depicting embodiments of methods in a wireless device.

An example of a flowchart depicting embodiments of a method performed by the wireless device 10,120, e.g. to receive scheduled positioning system information, is depicted in FIG. 4 and will be described more in detail in the following. As previously mentioned, the wireless device 10,120 and the radio network node 20,110 operate in the wireless communications network 100. The method may comprise one or more of the following actions which actions may be taken in any suitable order. Further, it should be understood that one or more actions may be optional and that actions may be combined.

In Action 401, the wireless device 10,120 retrieves or receives positioning system information broadcast scheduling details (pSI) from the radio network node (RNN) 20,110. Thus, the network node mentioned in FIG. 4 may be the radio network node 20, 110 illustrated in FIG. 3.

As will be described in Actions 403 and 404 below, the pSI will be used by the wireless device 10, 120 to determine in which subframes one or more SI messages comprising one or more pSIBs (pSIMs) are scheduled by the RNN 20,110 and to receive the one or more pSIMs. As will be described below, the pSIM may comprise one or more pSIBs, and each pSIB may comprise one or more segments of positioning assistance data which may be used by the wireless device 10, 120 to determine its position.

The term positioning system information broadcast scheduling details pSI is sometimes in this disclosure referred to as positioning system information Scheduling Information (pSI), positioning SIB scheduling information or to just scheduling information. It should be understood that the terms may be used interchangeably. Thus, the pSI comprises scheduling information relating to positioning system information, such as scheduling information relating to positioning System Information Blocks (pSIBs). Since one or more pSIBs may be comprised in an SI Message comprising one or more pSIBs (pSIM), the pSI may also be said to comprise scheduling information relating to one or more pSIM. Therefore, the pSI may comprise information about one or more pSIBs that are comprised in a pSIM or information about how one or more pSIMs are scheduled. Further, in the text below relating to proposed updates of the 3GPP RRC specification, it is described that scheduling information is given by the posSchedulingnfoList in SystemInformationblockType1.

In some embodiments, each pSIM comprises one or more pSIBs, and each pSIB comprises one or more segments of positioning assistance data.

The pSI may comprise one or more out of: a Global Navigation Satellite System identity (GNSS ID) per pSIB type; and an indication of whether or not the one or more pSIBs of each pSIM is encrypted.

Further, the number of pSIMs per SI window may indicate the number of PSIMs scheduled after an SI message in an SI window.

In Action 402, the wireless device 10,120 retrieves or receives, from the RNN 20,110, at least one out of: a scheduling offset and/or a number of additional SI messages with positioning SIBs, i.e. a number of additional pSIMs, per SI window. Thereby, the wireless device 10, 120 will obtain information about an offset used and/or if additional pSIMs exist.

As will be described below, in e.g. Action 603, the scheduling offset may be an indication of another starting position of the SI messages of positioning SIBs within the shortest SI periodicity of 80 ms. The another starting position of the pSIMs may be given by a base starting position which has been shifted by an offset indicated by the scheduling offset. The offset may be a number of subframes. Since the scheduling offset may be an indication of another starting position of the pSIMs it should be understood that the scheduling offset does not have to comprise any information about the offset to use when shifting the starting position. Instead it should be understood that the scheduling offset may indicate a shifted starting position. Thus, the scheduling offset may indicate that a predefined, preconfigured and/or predetermined offset is to be used for shifting the base/normal starting position. In section 1.1 below an offset of 8 subframes is proposed.

In some embodiments, the scheduling offset is an indication of a shifted starting position. The scheduling offset may be equal to an SI periodicity. For example, the SI periodicity may be 8 subframes.

In Action 403, the wireless device 10,120 determines, based on the obtained information comprising the retrieved information, where, e.g. in which subframes, the pSIMs are scheduled by the RNN 20,110. For example, based on the pSI, the scheduling offset and/or the number of additional pSIMs, i.e. additional SI messages with positioning SIBs, per SI window obtained in Actions 401 and 402 above, the wireless device 10,120 determines where the pSIMs are scheduled by the RNN 20,110. Thus, the wireless device 10, 120 determines in which subframes one or more pSIMs are scheduled by the radio network node 20, 110 based on the pSI and based on at least one out of: the scheduling offset; and the number of pSIMs per SI window.

As previously mentioned, a pSIM is an SI message comprising one or more pSIBs.

In some embodiments, the wireless device 10, 120 determines in which subframes the one or more pSIMs are scheduled based on the pSI and the scheduling offset by determining a start subframe number a for a pSIM as $a = x \bmod 10$ in a radio frame for which $SFN \bmod T = \text{Floor}(x/10) + 8$, wherein SFN is a subframe number, T is an SI periodicity of the pSIM, 8 is indicated by the scheduling offset and x is an integer value given by $x = m \cdot w_m + (n-1) \cdot w_n$, wherein m is a number of SI messages, $w_m$ is a window length of the SI message, n gives an order of entry in the list of pSIMs and is given by the pSI, and $w_n$ is a window length of the pSIM. It should be understood that the parameters wn and wm may be restricted to be the same value. Thus, the pSIM and the SI message may be of the same window length.

Alternatively or additionally, in some embodiments, the wireless device 10, 120 determines in which subframes the one or more pSIMs are scheduled based on the pSI and the number of pSIMs per SI window by determining a start subframe number a for a pSIM as a=x mod 10 in a radio frame for which SFN mod T=Floor (x/10), wherein SFN is a subframe number, T is an SI periodicity of the pSIM, and x is an integer value given by x=FLOOR((n−1)/c)*wn, wherein n gives an order of entry in the list of pSIMs and is given by the pSI, c is the number of pSIMs scheduled per SI window, and wn is a window length of the pSIM. As mentioned above, it should be understood that the parameters wn and wm may be restricted to be the same value.

In Action 404, the wireless device 10,120 uses the determined information to receive one or more pSIMs, i.e. the SI messages with the pSIBs. In other words, the wireless device 10, 120 uses the determined scheduling of the one or more pSIMs for receiving the one or more pSIMs.

In Action 405, the wireless device 10,120 decodes the information of the pSIMs and uses the decoded information to assist positioning. In other words, the wireless device 10,120 decodes the information of the pSIMs and uses the information to determine what positioning signals (from satellites, cellular entities, other wireless devices etc.) that are available, in what radio resources the positioning signals are transmitted, or to determine it's position. Thus in some embodiments, the wireless device 10, 120 decodes the information of the received one or more pSIMs and uses the decoded information to assist positioning of the wireless device 10, 120.

Figure 5:
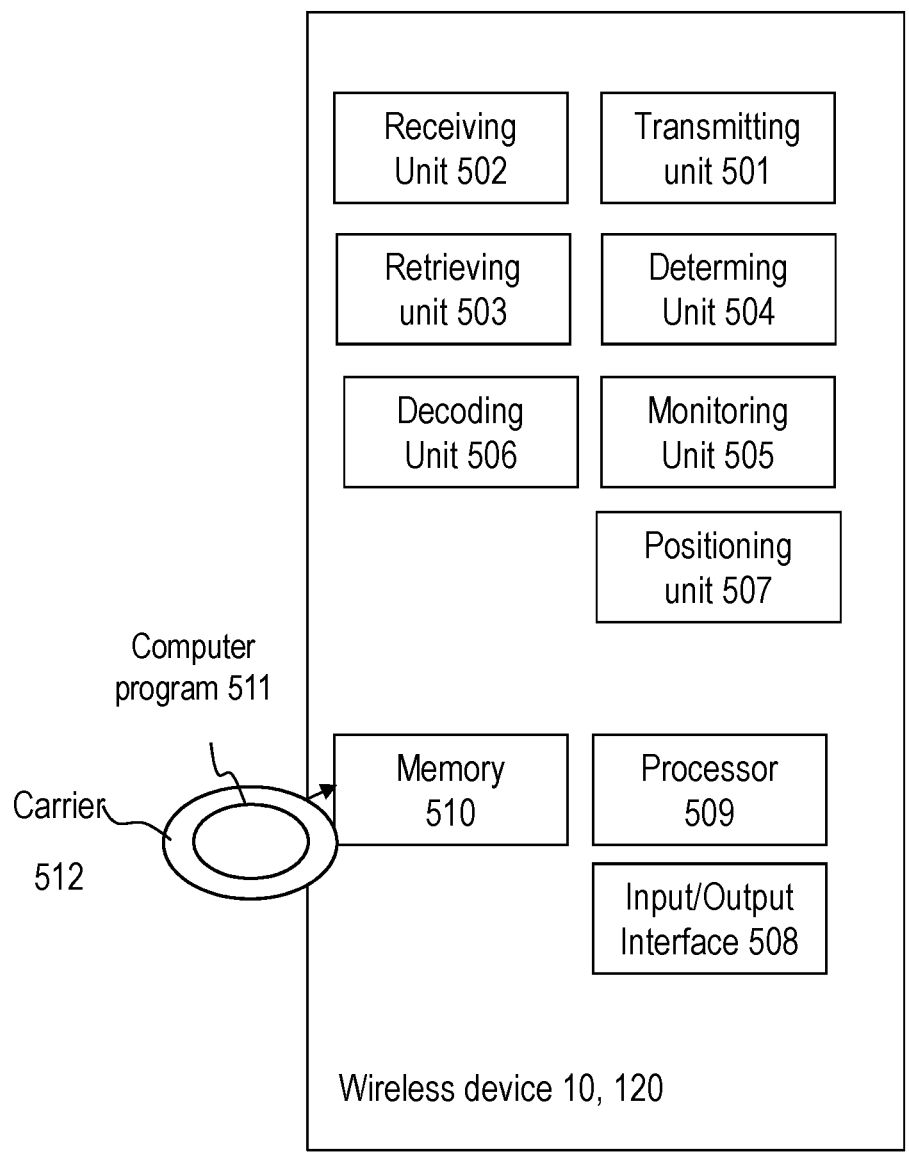
FIG. 5 is schematic block diagram illustrating embodiments of a wireless device.

To perform the method actions e.g. for receiving scheduled positioning system information, the wireless device 10,120 may comprise the arrangement depicted in FIG. 5. The wireless device 120 may e.g. comprise a transmitting unit 501, a receiving unit 502, a retrieving unit 503, a determining unit 504, a monitoring unit 505, a decoding unit 506 and a positioning unit 507. As previously mentioned, the wireless device 10, 120 and the radio network node 20, 110 are configured to operate in the wireless communications network 100.

The wireless device 10,120 is configured to transmit, e.g. by means of the transmitting unit 501, a signal, message or information to one or more nodes operating in the communications network 100. The transmitting unit 501 may be implemented by or arranged in communication with a processor 509 of the wireless device 10, 120. The processor 508 will be described in more detail below.

The wireless device 10,120 is configured to receive, e.g. by means of the receiving unit 502, a signal, message or information from one or more nodes operating in the communications network 100. The receiving unit 502 may be implemented by or arranged in communication with the processor 509 of the wireless device 10, 120.

The wireless device 10, 120 is configured to receive pSI from the radio network node 20,110.

Further, the wireless device 10, 120 is configured to receives, from the radio network node 20,110, at least one out of: the scheduling offset and/or the number of pSIMs per SI window.

As mentioned above and in some embodiments, each pSIM comprises one or more pSIBs, and each pSIB comprises one or more segments of positioning assistance data. As also mentioned above, the pSI may comprise one or more out of: a GNSS ID per pSIB type; and an indication of whether or not the one or more pSIBs of each pSIM is encrypted. Further, the number of pSIMs per SI window may indicate the number of PSIMs scheduled after an SI message in an SI window.

Further, the wireless device 10, 120 is configured to use determined scheduling of the one or more pSIMs for receiving the one or more pSIMs.

The wireless device 10,120 may be configured to retrieve, e.g. by means of the retrieving unit 503, a message or information from one or more nodes operating in the communications network 100. The retrieving unit 503 may be implemented by or arranged in communication with the processor 509 of the wireless device 10, 120.

It should be understood that the wireless device 10, 120 does not have to receive the information mentioned above and that the wireless device 10, 120 may be configured to configured to retrieve the pSI, and at least one out of: the scheduling offset and/or the number of pSIMs per SI window from the radio network node 20, 110.

The wireless device 10,120 is configured to determine, e.g. by means of the determining unit 504, the scheduling of one more pSIMs, i.e. where the one or more pSIMs are scheduled by the radio network node 20, 110. The determining unit 504 may be implemented by or arranged in communication with the processor 509 of the wireless device 10, 120.

Thus, the wireless device 10, 120 is configured to determine in which subframes one or more pSIMs are scheduled by the radio network node 20, 110 based on the pSI and based on at least one out of: the scheduling offset; and the number of pSIMs per SI window.

As previously mentioned, a pSIM is an SI message comprising one or more pSIBs.

In some embodiments, the wireless device 10, 120 is configured to determine in which subframes the one or more pSIMs are scheduled based on the pSI and the scheduling offset by determining a start subframe number a for a pSIM as a=x mod 10 in a radio frame for which SFN mod T=Floor (x/10)+8, wherein SFN is a subframe number, T is an SI periodicity of the pSIM, 8 is indicated by the scheduling offset and x is an integer value given by x=m*wm+(n−1)*wn, wherein m is a number of SI messages, wm is a window length of the SI message, n gives an order of entry in the list of pSIMs and is given by the pSI, and wn is a window length of the pSIM. As also previously mentioned, the parameters wn and wm may be restricted to be the same value.

Alternatively or additionally, in some embodiments, the wireless device 10, 120 is configured to determine in which subframes the one or more pSIMs are scheduled based on the pSI and the number of pSIMs per SI window by determining a start subframe number a for a pSIM as a=x mod 10 in a radio frame for which SFN mod T=Floor (x/10), wherein SFN is a subframe number, T is an SI periodicity of the pSIM, and x is an integer value given by x=FLOOR ((n−1)/c)*wn, wherein n gives an order of entry in the list of pSIMs and is given by the pSI, c is the number of pSIMs scheduled per SI window, and wn is a window length of the pSIM. As mentioned above, the parameters wn and wm may be restricted to be the same value.

The first wireless device 10,120 is configured to monitor, e.g. by means of the monitoring unit 505, monitor operation in the wireless communications network 100. The monitoring unit 505 may be implemented by or arranged in communication with the processor 509 of the first wireless device 10, 120.

The first wireless device 10,120 may be configured to decode, e.g. by means of the decoding unit 506, information of the received one or more pSIMs. The decoding unit 506 may be implemented by or arranged in communication with the processor 509 of the first wireless device 10, 120.

Thus, the wireless device 10, 120 may be configured to decode the information of the received one or more pSIMs.

The first wireless device 10,120 may be configured to performing positioning e.g. by means of the positioning unit 507. The positioning unit 507 may be implemented by or arranged in communication with the processor 509 of the first wireless device 10, 120.

Thus, the first wireless device 10,120 may be configured to use the decoded information to assist positioning of the wireless device 10, 120.

Those skilled in the art will also appreciate that the units in the wireless device 10,120, described above may refer to a combination of analog and digital circuits, and/or one or more processors configured with software and/or firmware, e.g. stored in the wireless device 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The wireless device 10,120 may comprise an Input and output Interface 508 configured to communicate with the network node 20,110 and the location server 40,132. The input and output interface may comprise a wireless receiver (not shown) and a wireless transmitter (not shown).

The embodiments herein may be implemented through a respective processor or one or more processors, such as the processor 509 of a processing circuitry in wireless device 10,120 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 510 comprising one or more memory units. The memory comprises instructions executable by the processor in the wireless device 120.

The memory is arranged to be used to store e.g. data, configurations, and applications to perform the methods herein when being executed in the wireless device 120.

Some embodiments of the wireless device 10,120 may comprise:
- a radio circuitry configured to monitor for and retrieve pSIM scheduling information and pSIMs according to the monitoring determined by a processing unit,
- a storage, configured to store pSIM scheduling information and pSIBs
- the processing unit configured to determine a pSIM monitoring based on the pSIM scheduling information and in what radio resources the pSIMs will be scheduled in.

Figure 6:
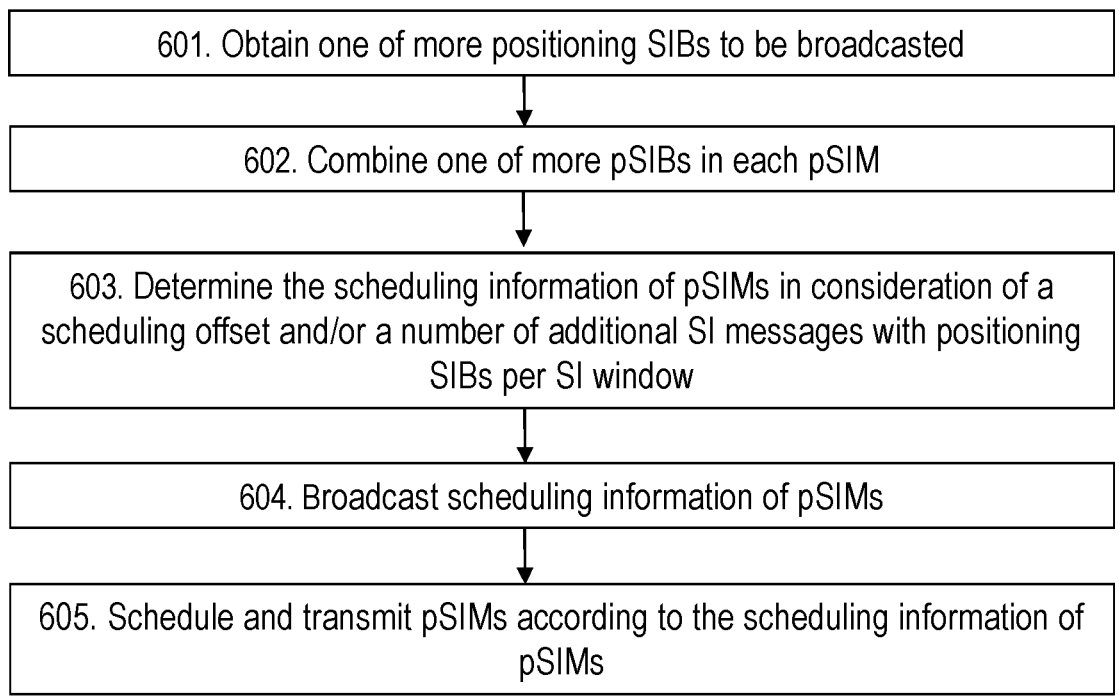
FIG. 6 is a flowchart depicting embodiments of a method in a radio network node.

Example embodiments of a flowchart depicting embodiments of a method performed by the radio network node 20,110, e.g. the eNB, to transmit scheduled positioning system information to the wireless device 10,120 is depicted in FIG. 6 and will be described more in detail in the following. As previously mentioned, the first wireless device 10, 120 and the radio network node 20, 110 operate in the wireless communications network 100. The method may comprise one or more of the following actions which actions may be taken in any suitable order. Further, it should be understood that one or more actions may be optional and that actions may be combined.

In Action 601, the radio network node 20, 110 obtains, from a network node (NN) 30, 132, e.g. a location server, an E-SMLC, or an LMF, one or more positioning SIBs (pSIBs) to be broadcasted. Thus, the radio network node 20, 110 obtains one or more pSIBs. Each pSIB may comprise one or more segments of positioning assistance data.

In Action 602, the RNN 20,110 combines one or more of the obtained one or more pSIBs in one or more pSIMs. For example, one or more of the obtained one or more pSIBs may be combined in each pSIM. This may also be expressed as the RNN 20,110 compiles one or more pSIM to comprise one or more pSIBs. As previously mentioned, a pSIM is an SI message comprising pSIBs.

In Action 603, the radio network node 20,110 determines scheduling information of the one or more pSIMs in consideration of a scheduling offset and/or a number of additional pSIMs per SI window. In other words, the radio network node 20,110 determines positioning system information scheduling information (pSI) of the one or more pSIMs in consideration of at least one out of a scheduling offset and a number of pSIMs per SI window.

As previously mentioned, the pSI may comprise one or more out of a GNSS ID per pSIB type; and an indication of whether or not the one or more pSIBs of each pSIM is encrypted.

For example, the scheduling offset may be an indication of another starting position of the SI messages of positioning SIBs within the shortest SI periodicity of 80 ms. The another starting position may be a shifted starting position. Thus, the scheduling offset may be an indication of the shifted starting position. The another starting position of the pSIMs is given by a base starting position which has been shifted by an offset indicated by the scheduling offset. The offset may be a number of subframes. Since the scheduling offset may be an indication of another starting position of the pSIMs, it should be understood that the scheduling offset does not have to comprise any information about the offset to use when shifting the starting position. Instead it should be understood that the scheduling offset may indicate that a predefined, preconfigured and/or predetermined offset is to be used. In section 1.1 below an offset of 8 subframes is proposed. Thus in some embodiments, the scheduling offset is an indication of a shifted starting position. Further, the scheduling offset may be equal to an SI periodicity. The SI periodicity may be 8 subframes.

Further, the number of additional pSIMs per SI window may be one or more depending on the SI window size and the scheduling offset. Thus, the number of pSIMs per SI window indicates the number of pSIMs scheduled after an SI message in an SI window.

In Action 604, the radio network node 20,110 broadcasts scheduling information of the pSIMs. In other words, the radio network node 20,110 broadcasts scheduling information relating to the one or more pSIMs. In other words, the radio network node 20,110 broadcasts the determined pSI of the one or more pSIMs and the at least one out of the scheduling offset and the number of pSIMs.

As previously mentioned, the scheduling information may sometimes in this disclosure be referred to as positioning system information broadcast details or positioning system information Scheduling Information pSI, just to give some examples. The scheduling information may comprise the scheduling offset and/or the number of pSIMs per SI window. As previously mentioned, this information is received by the wireless device 10, 120 in Actions 401 and 402.

In Action 605, the radio network node 20,110 schedules and transmits pSIMs according to the scheduling information of pSIMs. Thus, the radio network node 20, 110 schedules and transmits the pSIMs to the wireless device 10, 120 in accordance with the scheduling information. In other words, the radio network node 20, 110 schedules and transmits the one or more pSIMs according to the determined pSI.

Figure 7:
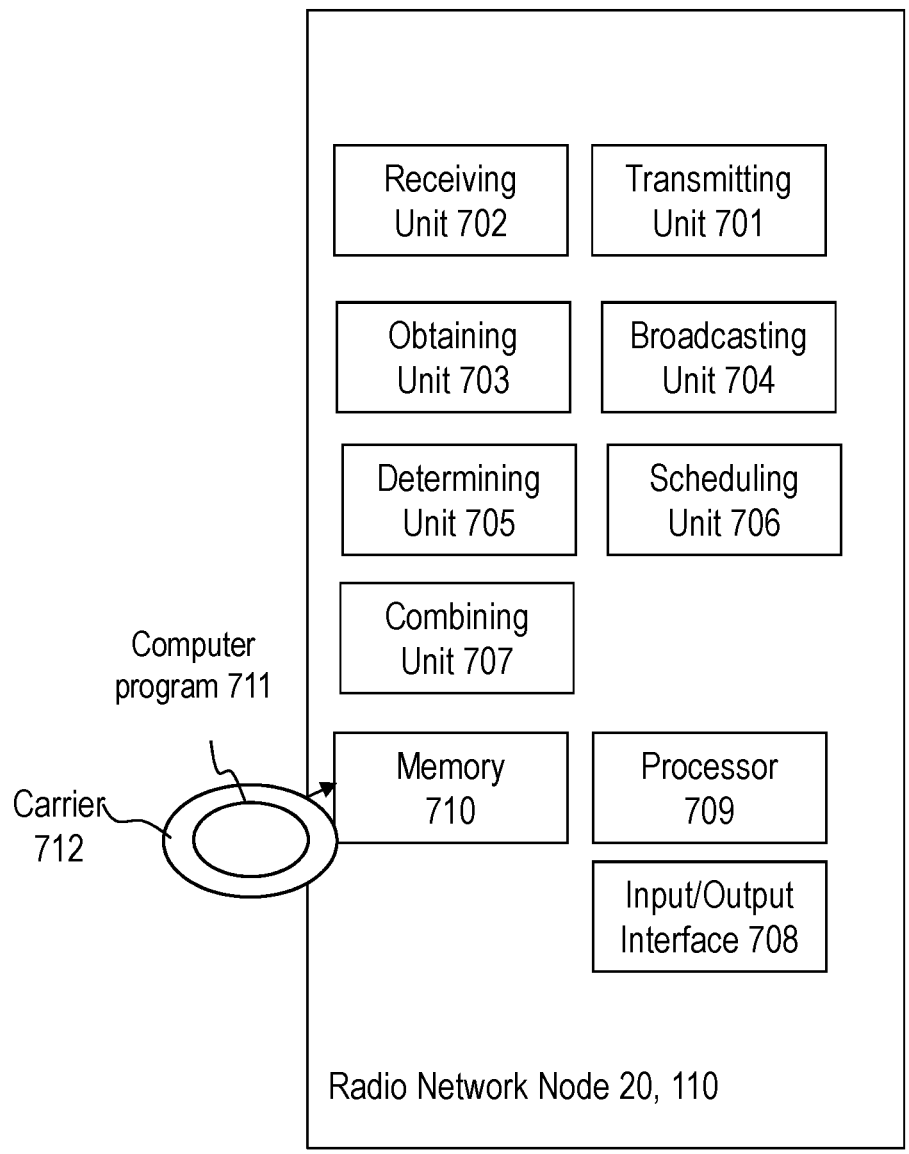
FIG. 7 is schematic block diagram illustrating embodiments of a radio network node.

To perform the method actions e.g. for transmitting scheduled positioning system information to the wireless device 10,120, the radio network node 20,110 may comprise the arrangement depicted in FIG. 7. The radio network node 20,110 may e.g. comprise a transmitting unit 701, a receiving unit 702, an obtaining unit 703, a broadcasting unit 704, a determining unit 705, a scheduling unit 706, and a combining unit 707. As previously mentioned, the first wireless device 10, 120 and the radio network node 20, 110 are configured to operate in the wireless communications network 100.

The radio network node 20,110 is configured to transmit, e.g. by means of the transmitting unit 701, a signal, message or information to one or more nodes operating in the communications network 100. The transmitting unit 701 may be implemented by or arranged in communication with a processor 709 of the radio network node 20,110. The processor 709 will be described in more detail below.

The radio network node 20,110 is configured to transmit one or more pSIMs according to a scheduling.

The radio network node 20,110 may be configured to receive, e.g. by means of the receiving unit 702, a signal, message or information from one or more nodes operating in the communications network 100. The receiving unit 702 may be implemented by or arranged in communication with the processor 709 of the radio network node 20,110.

The radio network node 20,110 may be configured to receive one or more pSIBs. For example, the radio network node 20,110 may configured to receive the one or more pSIBs from the network node 30, 132.

As previously mentioned, each pSIB comprises one or more segments of positioning assistance data.

The radio network node 20,110 is configured to obtain, e.g. by means of the obtaining unit 703, a signal, message or information from one or more nodes operating in the communications network 100. The obtaining unit 703 may be implemented by or arranged in communication with the processor 709 of the radio network node 20,110.

The radio network node 20,110 is configured to obtain one or more pSIBs. It should be understood that the radio network node 20, 110 may be configured receive the one or more pSIBs as mentioned above.

For example, the radio network node 20,110 may configured to obtain the one or more pSIBs from the network node 30, 132.

The radio network node 20,110 is configured to broadcast, e.g. by means of the broadcasting unit 704, a signal, message or information from one or more nodes operating in the communications network 100. The broadcasting unit 704 may be implemented by or arranged in communication with the processor 709 of the radio network node 20,110. The broadcasting unit 704 may be a part of or correspond to the transmitting unit 701.

The radio network node 20,110 is configured to broadcast the determined pSI of the one or more pSIMs and the at least one out of the scheduling offset and the number of pSIMs.

As previously mentioned, the pSI comprises one or more out of a GNSS ID per pSIB type and an indication of whether or not the one or more pSIBs of each pSIM is encrypted.

As also previously mentioned, the scheduling offset may be an indication of a shifted starting position. Further, the scheduling offset may be equal to an SI periodicity. For example, the SI periodicity may be 8 subframes.

As previously mentioned, the number of pSIMs per SI window indicates the number of pSIMs scheduled after an SI message in an SI window.

The radio network node 20,110 is configured to determine, e.g. by means of the determining unit 705, pSI. The determining unit 705 may be implemented by or arranged in communication with the processor 709 of the radio network node 20,110.

The radio network node 20,110 is configured to determine positioning system information Scheduling Information (pSI) of the one or more pSIMs in consideration of at least one out of a scheduling offset and a number of pSIMs per SI window.

The radio network node 20,110 is configured to schedule, e.g. by means of the scheduling unit 706, one or more pSIMs. The scheduling unit 706 may be implemented by or arranged in communication with the processor 709 of the radio network node 20,110.

The radio network node 20,110 is configured to schedule the one or more pSIMs according to the determined pSI.

The radio network node 20,110 is configured to combine, e.g. by means of the combining unit 707, one or more pSIMs. The combining unit 707 may be implemented by or arranged in communication with the processor 709 of the radio network node 20,110.

The radio network node 20,110 is configured to compile one or more pSIMs to comprise one or more pSIBs.

Those skilled in the art will also appreciate that the units in the radio network node 20,110 described above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 20,110 may comprise an Input and output Interface 708 configured to communicate with one or more out of the wireless device 10,120, 122, the network node 40,130, and the location server 30,132. The input and output interface may comprise a wireless receiver (not shown) and a wireless transmitter (not shown).

The embodiments herein may be implemented through a respective processor or one or more processors, such as the processor 709 of a processing circuitry in network node 110 depicted in FIG. 7, together with respective computer program code for performing functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 710 comprising one or more memory units. The memory comprises instructions executable by the processor in the network node 110.

The memory is arranged to be used to store e.g. data, configurations, and applications to perform the methods herein when being executed in the network node 110. For example, the memory may comprise the buffer having the buffer size referred to herein.

Some embodiments of the radio network node 20,110 may comprise:
- a communication circuitry configured to communicate with and obtain positioning data elements from a NN 30,
- a storage configured to store the positioning assistance data and support the processing,
- a processing unit configured to determine the possible scheduling of the positioning assistance data, compile the pSIBs, and to determine the scheduling of the pSIMs, and the pSIM scheduling information, and
- a radio circuitry configured to broadcast the pSIMs according to the determined schedule.

In some embodiments, a respective computer program 711 comprises instructions, which when executed by the respective at least one processor, cause the at least one processor of the network node 20, 110 to perform one or more of the actions described herein.

In some embodiments, a respective computer program 511 comprises instructions, which when executed by the respective at least one processor, cause the at least one processor of the wireless device 10,120 to perform the actions described herein.

In some embodiments, a respective carrier 512,712 comprises the respective computer program, wherein the carrier is one of an electronic signal, an optical signal, an electromagnetic signal, a magnetic signal, an electric signal, a radio signal, a microwave signal, or a computer-readable storage medium.

Below a more detailed description will follow.

Embodiments disclosed herein may be separated into different parts which will be described in more detail below. For example, the positioning assistance data is discussed in section 1.1, different means to introduce the scheduling offset are described in section 1.2, different ways to enable additional pSIMs in an SI window are described in section 1.3 and some signaling aspects are described in section 1.4. In the subsequent text, the prefix 'pos' is used to emphasize the association with positioning. Another possible prefix is 'gen' to emphasize that these are generic system information.

1.1 Positioning Assistance Data for System Information Broadcast

The RTK corrections comprise some of the positioning Assistance Data (AD) that is supported in the 3GPP Rel-15. This may be divided into two message types; a common message type and a generic message type. Common messages are in common for all GNSS, while the generic messages are associated to a specific GNSS via a configured GNSS-ID.

For example, the GNSS assistance data may be realized by the following assistance data elements. In one mode of some embodiments, each positioning assistance data element corresponds to a pSIB type.

| | assistance DataElement |
|---|---|
| GNSS Common Assistance Data | GNSS-ReferenceTime |
| | GNSS-ReferenceLocation |
| | GNSS-IonosphericModel |
| | GNSS-EarthOrientationParameters |
| | GNSS-RTK-ReferenceStationInfo |
| | GNSS-RTK-CommonObservationInfo |
| | GNSS-RTK-AuxiliaryStationData |
| GNSS Generic Assistance Data | GNSS-TimeModelList |
| | GNSS-DifferentialCorrections |
| | GNSS-NavigationModel |
| | GNSS-RealTimeIntegrity |
| | GNSS-DataBitAssistance |
| | GNSS-AcquisitionAssistance |
| | GNSS-Almanac |
| | GNSS-UTC-Model |
| | GNSS-AuxiliaryInformation |
| | BDS-DifferentialCorrections |
| | BDS-GridModelParameter |
| | GNSS-RTK-Observations |
| | GLO-RTK-BiasInformation |
| | GNSS-RTK-MAC-CorrectionDifferences |
| | GNSS-RTK-Residuals |
| | GNSS-RTK-FKP-Gradients |
| | GNSS-SSR-OrbitCorrections |
| | GNSS-SSR-ClockCorrections |
| | GNSS-SSR-CodeBias |

In addition, there may be additional pSIB types defined which are associated to other positioning methods. One example is the downlink Observed Time Difference Of Arrival (downlink OTDOA) method.

The pSIB type may be associated to an enumerable parameter, for example grouped by the categories below, or as a linear index per type. The size of each pSIB depends on a number of things such as whether the positioning assistance data has been segmented into multiple segments already at the network node 30,132, e.g. the location server, or if the full assistance data element is encoded. Furthermore, some assistance data elements scale with the number of satellites included in the assistance data element, etc. The network node 30, 132, e.g. the location server, will encode the positioning assistance data, optionally encrypt it, and send it to the radio network node 20, 110 as one or more segments per pSIB type. Some positioning assistance data will be encoded separately per GNSS. Therefore, the network node 30, 132 will indicate to the RNN 20, 110 the GNSS per pSIB type. The RNN 20, 110 will take the encoded positioning assistance data part, either provided as one or more segments and compile a pSIB per segment.

The pSIB itself may also include segmentation information such as sequence number, last segment indication etc.

The network node 30,132, e.g. the location server, or the RNN 20, 110 compiles pSIMs, each with one or more pSIBs, and schedules the pSIMs, and the scheduling information is compiled into a positioning SIB scheduling information pSI. The pSI also includes the GNSS ID per pSIB type (when applicable), and may include whether the pSIBs of the pSIM is encrypted, typically by providing the decryption key index per pSIB or pSIM. Further, the RNN 20, 110 transmits, e.g. broadcasts, the pSIMs in accordance with the scheduling.

1.2 Scheduling Offset for pSIMs

One limitation with the prior art comes from the fact that the starting position of the SI messages is the same for all periodicities. It has the advantage of enabling the UE, e.g. the wireless device 10, 120, to retrieve much of the system information in a short period of time in some time windows, but it also causes an unnecessary limitation.

In some embodiments, the starting position of the SI messages of positioning SIBs (pSIMs) is shifted by an offset of the shortest SI periodicity 80 ms. The SI periodicity of 80 ms may also be expressed as being 8 subframes, and thus the starting position may be shifted by an offset corresponding to 8 subframes. This means that only the legacy SI message of the shortest periodicity will occupy resources that may be used for pSIMs, which increases the available capacity for pSIMs. Other offsets than the shortest SI periodicity may also be considered.

Below the text in bold shows proposed updates of the 3GPP RRC specification 36.331 text:

---

1> determine the start of the SI-window for the concerned SI message for positioning SIBs as follows:
  2> for legacy SI messages, determine the number m which corresponds to the number of SI messages configured by schedulingInfoList in SystemInformationBlockType1; that are associated to the shortest SI periodicity 8 radio frames (80 ms).
  2> for the concerned SI message, determine the number n which corresponds to the order of entry in the list of SI messages for positioning SIBs configured by *PosSchedulingInfoList* in SystemInformationBlockType1;
  2> determine the integer value $x = m*wm + (n - 1)*wn$, wher *wm* is the *si-WindowLength* and wn is the *si-PosWindowLength* ;
  2> the SI-window with the concerned SI message of positioning SIBs starts at the subframe #a, where a = x mod 10, in the radio frame for which SFN mod T = FLOOR(x/10) + 8, where T is the *si-PosPeriodicity* of the concerned SI message and 8 is the proposed offset corresponding to 8 subframes;

---

NOTE:
E-UTRAN should configure an SI-window of 1 ms only if all SIs are scheduled before subframe #5 in radio frames for which SFN mod 2 = 0.

---

In the text above, the concerned SI message is the SI message comprising pSIBs. In other words, the concerned SI message is the pSIM. Further, m is the number of SI messages i.e. the number of legacy SI messages not comprising pSIBs, wm is the window length of the SI message i.e. the legacy SI message not comprising pSIBs, n gives an order of entry in the list of pSIMs and is given by the posSchedulingInfoList e.g. by the pSI, and wn is the window length of the pSIM. As previously mentioned, it should be understood that the parameters wn and wm may be restricted to be the same value. Furthermore, as mentioned above, 8 is the proposed offset corresponding to 8 subframes. Thus, it should be understood that the scheduling offset may be an indication to use an offset of 8 subframes when shifting the starting position for the pSIM.

Figure 8:
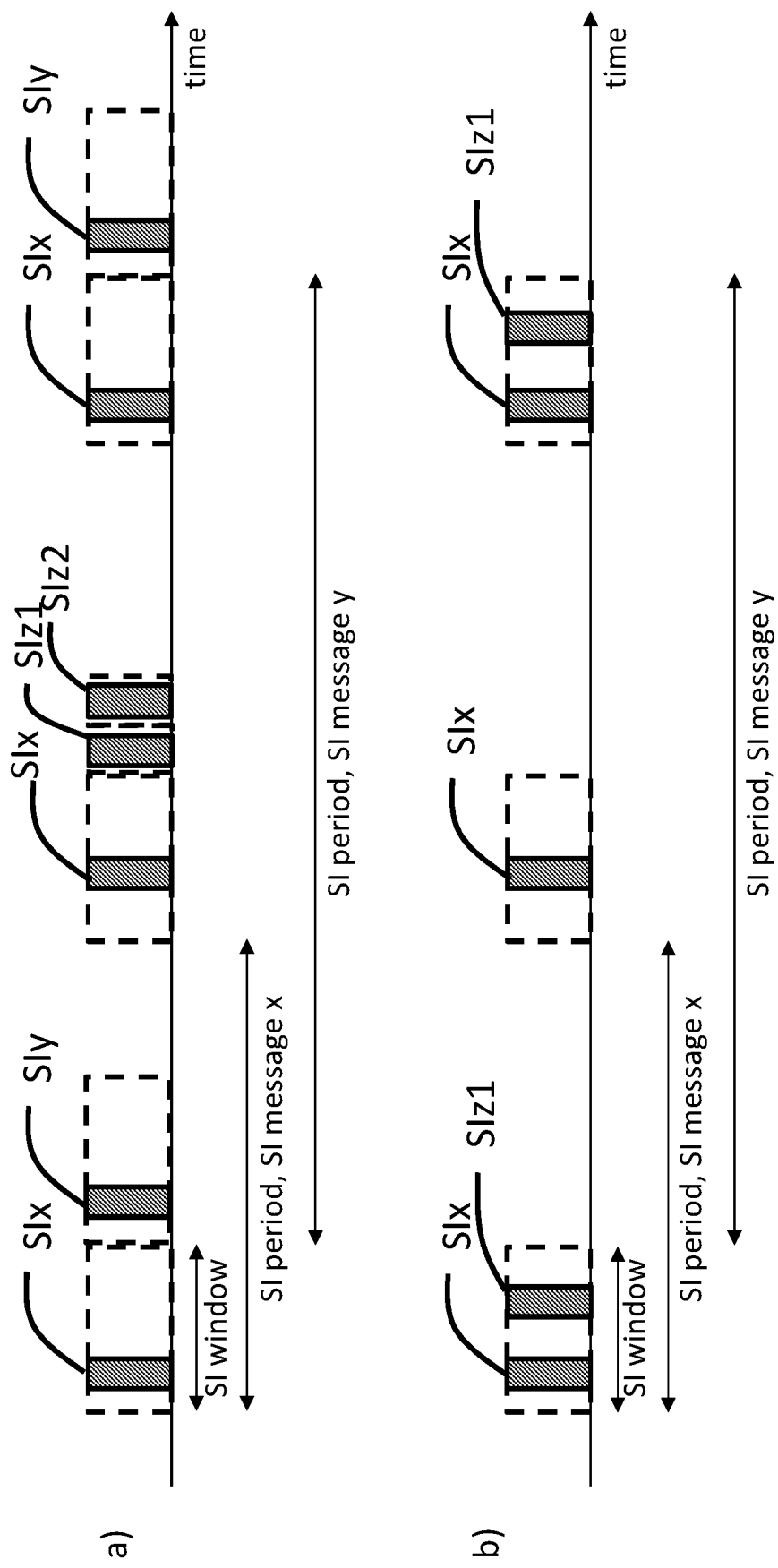
FIG. 8*a* schematically illustrates scheduling of SI messages with positioning SIBs (pSIMs) SIz using a scheduling offset.
FIG. 8*b* schematically illustrates scheduling of pSIMs SIz in an SI window comprising a legacy SI message SIx.

In the example illustrated in FIG. 8a, two SI messages of positioning SIBs, i.e. the two pSIMs, SIz1 and SIz2 with si-PosWindowLength 10 ms (may be the same as legacy, or as given in pSI separate from legacy) and with periodicity 1280 ms are added.

The first SI window of the first SI message starts at subframe #a, where x=0 and a=x mod 10=0 in the radio frame for which SFN mod 8=FLOOR(x/10)=0, i.e. the first SI message is broadcasted in SI windows of 10 ms that starts at SFN=0, 8, 16, . . .

The first SI window of the second SI message starts at subframe #a, where x=10 and a=x mod 10=0 in the radio frame for which SFN mod 16=FLOOR(x/10)=1, i.e. the second SI message is broadcasted in SI windows of 10 ms that starts at SFN 1, 17, 33, . . .

The first SI window of the first SI message with positioning SIBs, i.e. first SI window of the first pSIM, starts at subframe #a, where x=10*1+0*10=10 and a=x mod 10=0 in the radio frame for which SFN mod 128=FLOOR(x/10)+8=9, i.e. the second SI message is broadcasted in SI windows of 10 ms that starts at SFN 9, 137, 265, . . . In FIG. 8a, the first pSIM is shown as Siz1. As mentioned above, 8 in the expression SFN mod 128=FLOOR(x/10)+8 is the offset which may be indicated by the scheduling offset.

The first SI window of the second SI message with positioning SIBs, i.e. the first SI window of the second pSIM, starts at subframe #a, where x=10*1+1*10=20 and a=x mod 10=0 in the radio frame for which SFN mod 128=FLOOR(x/10)+8=10, i.e. the second SI message is broadcasted in SI windows of 10 ms that starts at SFN 10, 138, 266, . . . In FIG. 8a, the second pSIM is shown as SIz2. As mentioned above, 8 in the expression SFN mod 128=FLOOR(x/10)+8 is the offset which may be indicated by the scheduling offset.

With this structure, only the legacy SI messages with the shortest periodicity occupy resources, and typically, these are only one or even not even one. Thereby, there are more resources available for SI messages with positioning SIBs, i.e. for the pSIMs, as illustrated by FIG. 8a.

1.3 Additional SI Messages with Positioning SIBs, i.e. One or More pSIMs in Addition to a Legacy SI Message, Per SI Window In some alternative embodiments, one or more pSIMs are scheduled in an SI window even if a legacy SI message already has been scheduled in the SI window.

The main challenge with considering additional SI messages, e.g. one or more pSIMs in addition to the legacy SI message, in the SI window is to avoid impact on the legacy in SI message scheduling. However, the 3GPP RRC specification in 36.331 stipulates:

---

1>receive DL-SCH using the SI-RNTI from the start of the SI-window and continue until
the end of the SI-window whose absolute length in time is given by si-WindowLength, or until the SI message was received, excluding the following subframes:
  2> subframe #5 in radio frames for which SFN mod 2 = 0;
  2> any MBSFN subframes;

-continued

> 2> any uplink subframes in TDD;
> 1> if the SI message was not received by the end of the SI-window, repeat reception at the next SI-window occasion for the concerned SI message;

This means that as long as any additional SI messages in an SI window containing a legacy SI message is scheduled after the legacy SI message, there will be no impact on the legacy behaviour. Hence it is possible to schedule additional SI messages with positioning SIBs in an SI window containing a legacy SI message, and also to schedule multiple SI messages with positioning SIBs in the same SI window. There is a need to also signal the number of SI messages scheduled in each SI window. In this case, it would be most convenient to use the same si-PosWindowLength as legacy, even though it would be possible to allow separate configurations as long as the rule to always schedule the legacy SI message ahead of any other SI message sin the legacy SI window.

FIG. 8b illustrates an example with a legacy SI message SIx and a new SI message with positioning SIBs SIz1. As mentioned above, an SI message comprising positioning SIBs is sometimes referred to as a pSIM. Thus, FIG. 8b schematically illustrates the scheduling of the legacy SI message SIx and the pSIM SIz1 within the same SI windows. Note that pSIM SIz1 is scheduled after the legacy SI message SIx in the SI windows where they coincide.

Below the text in bold shows proposed updates to the 3GPP RRC specification 36.331 text:

the radio frame for which SFN mod 128=FLOOR(x/10)=0, i.e. the first SI message is broadcasted in SI windows of 10 ms that starts at SFN 0, 128, 256, . . .

The first SI window of the second SI message with positioning SIBs, i.e. the first SI window of the second pSIM SIz2, starts at subframe #a, where x=0 and a=x mod 10=0 in the radio frame for which SFN mod 128=FLOOR(x/10)=0, i.e. the second SI message is broadcasted in SI windows of 10 ms that starts at SFN 0, 128, 256, . . .

The first SI window of the third SI message with positioning SIBs, i.e. the first SI window of the third pSIM SIz3, starts at subframe #a, where x=10 and a=x mod 10=1 in the radio frame for which SFN mod 128=FLOOR(x/10)=1, i.e. the third SI message is broadcasted in SI windows of 10 ms that starts at SFN 1, 129, 257, . . .

In case there are any legacy SI message, this will always be scheduled first in its SI window. If the SI window for pSIMs are different from the SI window of legacy SI messages, the legacy SI message has to be transmitted first in its SI window. It is also possible to combine with an offset as above in which case the overlap with legacy SI messages > 1>determine the start of the SI-window for the concerned SI message for positioning SIBs as follows:
> 2>for the concerned SI message, determine the number n which corresponds to the order of entry in the list of SI messages for positioning SIBs configured by posSchedulingInfoList in SystemInformationBlockType1; and the number c which corresponds to the number of additional SI
> messages with positioning SIBs can are scheduled in the same SI window
> 2> **determine the integer value x = FLOOR((n − 1)/c)\*wn** , where *wn* is the *si-WindowLength* and
> *wn* is the *si-posWindowLength* ;
> 2> the SI-window with the concerned SI message of positioning SIBs starts at the subframe #a, where a = x mod 10, in the radio frame for which SFN mod T = FLOOR(x/10), where T is the *si-PosPeriodicity* of the concerned SI message;

NOTE:
E-UTRAN should configure an SI-window of 1 ms only if all SIs are scheduled before subframe #5 in radio frames for which SEN mod 2 = 0.

In the text above, it should be understood that the wm being the si-WindowLength is the window length of an SI message that does not comprise any pSIBs. Thus, the wm may be referred to as the window length of a non-positioning SI message. Further, it should be understood that the wn being the si-posWindowLength is the window length of a SI message comprising one or more pSIBs. Thus, the wn is the window length of the pSIM. As previously mentioned, it should be understood that the parameters wn and wm may be restricted to be the same value. Furthermore, n gives an order of entry in the list of pSIMs and c gives the number of pSIMs in the same SI window. For example, consider an addition of five SI messages of positioning SIBs SIz1 to SIz3 with si-PosWindowLength ms (may be the same as legacy, or as in pSI separate from legacy), with additional number of SIBs 2 and with periodicity 1280 ms.

The first SI window of the first SI message with positioning SIBs, i.e. the first SI window of the first pSIM SIz1, starts at subframe #a, where x=0 and a=x mod 10=0 in will be less, or the pSIMs may be scheduled in SI windows directly after the SI windows of legacy SI messages.

1.4 Signaling Aspects

In some embodiments, the positioning SIBs and the pSIMs are instances of a generic SIB as outlined below as extensions to the 3GPP RRC specification in 36.331.

1.4.1 System information

The SystemInformation message is used to convey one or more System Information Blocks (SIBs) or Generic System Information Blocks (genSIBs). All the SIBs or genSIBs included are transmitted with the same periodicity. System information Bandwidth Reduced (SystemInformation-BR) and System Information Multimedia Broadcast Multicast Service (SystemInformation-MBMS) use the same structure as SystemInformation.

Signaling radio bearer: N/A
Radio Link Control Service Access Point (RLC-SAP): Transparent Mode (TM)
Logical channels: Broadcast Channel (BCCH) and Bandwidth Reduced BR-BCCH Direction: E-UTRAN to UE

*SystemInformation message*

```
-- ASN1START
SystemInformation-BR-r13 ::=    SystemInformation
SystemInformation-MBMS-r14 ::=  SystemInformation
SystemInformation ::=           SEQUENCE {
   criticalExtensions              CHOICE {
      systemInformation-r8            SystemInformation-r8-IEs,
      later                           CHOICE {
         genSystemInformation-r15        GenSystemInformation-r15-IEs,
         criticalExtensionsFuture
                                         SEQUENCE { }
      }
   }
}
SystemInformation-r8-IEs ::=    SEQUENCE {
   sib-TypeAndInfo                 SEQUENCE (SIZE (1..maxSIB)) OF CHOICE {
      sib2                             SystemInformationBlockType2,
      sib3                             SystemInformationBlockType3,
      sib4                             SystemInformationBlockType4,
      sib5                             SystemInformationBlockType5,
      sib6                             SystemInformationBlockType6,
      sib7                             SystemInformationBlockType7,
      sib8                             SystemInformationBlockType8,
      sib9                             SystemInformationBlockType9,
      sib10                            SystemInformationBlockType10,
      sib11                            SystemInformationBlockType11,
      ....,
      sib12-v920                       SystemInformationBlockType12-r9,
      sib13-v920                       SystemInformationBlockType13-r9,
      sib14-v1130                      SystemInformationBlockType14-r11,
      sib15-v1130                      SystemInformationBlockType15-r11,
      sib16-v1130                      SystemInformationBlockType16-r11,
      sib17-v1250                      SystemInformationBlockType17-r12,
      sib18-v1250                      SystemInformationBlockType18-r12,
      sib19-v1250                      SystemInformationBlockType19-r12,
      sib20-v1310                      SystemInformationBlockType20-r13,
      sib21-v1430                      SystemInformationBlockType21-r14
   },
   nonCriticalExtension             SystemInformation-v8a0-IEs    OPTIONAL
}
SystemInformation-v8a0-IEs ::= SEQUENCE {
   lateNonCriticalExtension         OCTET STRING              OPTIONAL,
   nonCriticalExtension             SEQUENCE { }              OPTIONAL
}
PosSystemInformation-r15-IEs ::= SEQUENCE {
   gen-sib-TypeAndInfo-r15          SEQUENCE (SIZE (1..maxSIB)) OF
GenericSystemInformationBlockType-r15,    ... },
   lateNonCriticalExtension         OCTET STRING              OPTIONAL,
   nonCriticalExtension             SEQUENCE { }              OPTIONAL
}
-- ASN1STOP
```

1.4.2 SystemInformationBlockType1

SystemInformationBlockType1 contains information relevant when evaluating if a UE is allowed to access a cell and defines the scheduling of other system information. SystemInformationBlockType1-BR uses the same structure as SystemInformationBlockType1.

Signaling radio bearer: N/A

RLC-SAP: TM

Logical channels: BCCH and BR-BCCH

Direction: E-UTRAN to UE

*SystemInformationBlockType1 message*

```
-- ASN1START
SystemInformationBlockType1-BR-r13 ::= SystemInformationBlockType1
SystemInformationBlockType1 ::=         SEQUENCE {
   cellAccessRelatedInfo                   SEQUENCE {
      plmn-IdentityList                       PLMN-IdentityList,
      trackingAreaCode                        TrackingAreaCode,
      cellIdentity                            CellIdentity,
      cellBarred                              ENUMERATED {barred, notBarred},
      intraFreqReselection                    ENUMERATED {allowed, notAllowed},
      csg-Indication                          BOOLEAN,
      csg-Identity                            CSG-Identity     OPTIONAL   -- Need OR
   },
   cellSelectionInfo                       SEQUENCE {
```

| SystemInformationBlockType1 message |
|---|

```
        q-RxLev-Min             Q-RxLev-Min,
        q-RxLev-MinOffset       INTEGER (1..8)      OPTIONAL    -- Need OP
    },
    p-Max                       P-Max               OPTIONAL,   --
Need OP
        freqBandIndicator       FreqBandIndicator,
        schedulingInfoList      SchedulingInfoList,
        tdd-Config              TDD-Config          OPTIONAL,   -- Cond TDD
        si-WindowLength         ENUMERATED {
                                    ms1, ms2, ms5, ms10, ms15, ms20,
                                    ms40},
        systemInfoValueTag      INTEGER (0..31),
        nonCriticalExtension    SystemInformationBlockType1-v890-IEs   OPTIONAL
}
SystemInformationBlockType1-v890-IEs::= SEQUENCE {
    lateNonCriticalExtension    OCTET STRING (CONTAINING
SystemInformationBlockType1-v8h0-IEs)       OPTIONAL,
    nonCriticalExtension        SystemInformationBlockType1-v920-IEs   OPTIONAL
}
-- Late non critical extensions
SystemInformationBlockType1-v8h0-IEs ::=    SEQUENCE {
    multiBandInfoList           MultiBandInfoList   OPTIONAL,   -- Need OR
    nonCriticalExtension        SystemInformationBlockType1-v9e0-IEs   OPTIONAL
}
SystemInformationBlockType1-v9e0-IEs ::= SEQUENCE {
    freqBandIndicator-v9e0      FreqBandIndicator-  OPTIONAL,   -- Cond
                                v9e0
FBI-max
    multiBandInfoList-v9e0      MultiBandInfoList-  OPTIONAL,   -- Cond
                                v9e0
mFBI-max
    nonCriticalExtension        SystemInformationBlockType1-v10j0-IEs OPTIONAL
}
SystemInformationBlockType1-v10j0-IEs ::= SEQUENCE {
    freqBandInfo-r10            NS-PmaxList-r10     OPTIONAL,   -- Need OR
    multiBandInfoList-v10j0     MultiBandInfoList-  OPTIONAL,   -- Need OR
                                v10j0
    nonCriticalExtension        SystemInformationBlockType1-v1010-IEs
        OPTIONAL
}
SystemInformationBlockType1-v1010-IEs ::= SEQUENCE {
    freqBandInfo-v1010          NS-PmaxList-v1010   OPTIONAL,   -- Need OR
    multiBandInfoList-v1010     MultiBandInfoList-  OPTIONAL,   -- Need OR
                                v1010
    nonCriticalExtension        SEQUENCE { }        OPTIONAL
}
-- Regular non critical extensions
SystemInformationBlockType1-v920-IEs ::=    SEQUENCE {
    ims-EmergencySupport-r9     ENUMERATED          OPTIONAL,   -- Need OR
                                {true}
    cellSelectionInfo-v920      CellSelectionInfo-  OPTIONAL,   -- Cond
                                v920
RSRQ
    nonCriticalExtension        SystemInformationBlockType1-v1130-IEs   OPTIONAL
}
SystemInformationBlockType1-v1130-IEs ::=   SEQUENCE {
    tdd-Config-v1130            TDD-Config-v1130    OPTIONAL,   -- Cond TDD-OR
    cellSelectionInfo-v1130     CellSelectionInfo-  OPTIONAL,   -- Cond WB-RSRQ
                                v1130
    nonCriticalExtension        SystemInformationBlockType1-v1250-IEs   OPTIONAL
}
SystemInformationBlockType1-v1250-IEs ::=   SEQUENCE {
    cellAccessRelatedInfo-v1250     SEQUENCE {
        category0Allowed-r12        ENUMERATED {true} OPTIONAL,   --
Need OP
    },
    cellSelectionInfo-v1250     CellSelectionInfo-  OPTIONAL,   -- Cond
                                v1250
RSRQ2
    freqBandIndicatorPriority-r12   ENUMERATED      OPTIONAL,   -- Cond
                                {true}
mFBI
    nonCriticalExtension        SystemInformationBlockType1-v1310-IEs OPTIONAL
}
SystemInformationBlockType1-v1310-IEs ::=   SEQUENCE {
    hyperSFN-r13                BIT STRING (SIZE (10))  OPTIONAL,   --
Need OR
    eDRX-Allowed-r13            ENUMERATED OPTIONAL,    --
                                {true}
```

| *SystemInformationBlockType1 message* |
|---|

```
Need OR
    cellSelectionInfoCE-r13              CellSelectionInfoCE-r13 OPTIONAL, -- Need OP
    bandwidthReducedAccessRelatedInfo-r13   SEQUENCE {
        si-WindowLength-BR-r13              ENUMERATED {
                                                ms20, ms40, ms60, ms80, ms120,
                                                ms160, ms200, spare},
        si-RepetitionPattern-r13            ENUMERATED {everyRF, every2ndRF,
every4thRF,
                                                    every8thRF},
        schedulingInfoList-BR-r13           SchedulingInfoList-   OPTIONAL,  --
Cond SI-BR                                  BR-r13
        fdd-DownlinkOrTddSubframeBitmapBR-  CHOICE {
r13
            subframePattern10-r13           BIT STRING (SIZE (10)),
            subframePattern40-r13           BIT STRING (SIZE (40))
        }                                                         OPTIONAL,  --
Need OP
        fdd-UplinkSubframeBitmapBR-r13      BIT STRING (SIZE      OPTIONAL,  --
                                            (10))
Need OP
        startSymbolBR-r13                   INTEGER (1..4),
        si-HoppingConfigCommon-r13          ENUMERATED {on,off},
        si-ValidityTime-r13                 ENUMERATED           OPTIONAL,   --
                                            {true}
Need OP
        systemInfoValueTagList-r13          SystemInfoValueTagList-r13 OPTIONAL   --
Need OR
    }                                                             OPTIONAL,  -- Cond BW-
reduced
    nonCriticalExtension                    SystemInformationBlockType1-v1320-IEs
        OPTIONAL
}
SystemInformationBlockType1-v1320-IEs ::= SEQUENCE {
    freqHoppingParametersDL-r13         SEQUENCE {
        mpdcch-pdsch-HoppingNB-r13          ENUMERATED {nb2, nb4}    OPTIONAL,  --
Need OR
        interval-DLHoppingConfigCommonModeA-r13 CHOICE {
            interval-FDD-r13                ENUMERATED {int1, int2, int4, int8},
            interval-TDD-r13                ENUMERATED {int1, int5, int10, int20}
        }                                                         OPTIONAL,  --
Need OR
        interval-DLHoppingConfigCommonModeB-r13 CHOICE {
            interval-FDD-r13                ENUMERATED {int2, int4, int8, int16},
            interval-TDD-r13                ENUMERATED { int5, int10, int20, int40}
        }                                                         OPTIONAL,  --
Need OR
        mpdcch-pdsch-HoppingOffset-r13      INTEGER (1..maxAvailNarrowBands-r13)
        OPTIONAL   -- Need OR
    }                                                             OPTIONAL,  -- Cond
Hopping
    nonCriticalExtension                    SystemInformationBlockType1-v1350-IEs
        OPTIONAL
}
SystemInformationBlockType1-v1350-IEs ::= SEQUENCE {
    cellSelectionInfoCE1-r13            CellSelectionInfoCE1-r13 OPTIONAL, -- Need
OP
    nonCriticalExtension                SystemInformationBlockType1-v1360-IEs
        OPTIONAL
}
SystemInformationBlockType1-v1360-IEs ::= SEQUENCE {
    cellSelectionInfoCE1-v1360          CellSelectionInfoCE1-v1360 OPTIONAL, -- Cond
QrxlevminCE1
    nonCriticalExtension                SystemInformationBlockType1-v1430-IEs
        OPTIONAL
}
SystemInformationBlockType1-v1430-IEs ::= SEQUENCE {
    eCallOverIMS-Support-r14            ENUMERATED {true} OPTIONAL, -- Need
OR
    tdd-Config-v1430                    TDD-Config-v1430     OPTIONAL, -- Cond
TDD-OR
    cellAccessRelatedInfoList-r14       SEQUENCE (SIZE (1..maxPLMN-1-r14)) OF
                                        CellAccessRelatedInfo- OPTIONAL, -- Need
                                        r14
OR
    nonCriticalExtension                SystemInformationBlockType1-v1450-IEs
        OPTIONAL
}
SystemInformationBlockType1-v1450-IEs ::=     SEQUENCE {
```

| *SystemInformationBlockType1 message* |
|---|

```
    tdd-Config-v1450              TDD-Config-v1450OPTIONAL, -- Cond
TDD-OR
    nonCriticalExtension          SystemInformationBlockType1-v15xy-IEs
}
SystemInformationBlockType1-v15xy-IEs ::=    SEQUENCE {
    gen-schedulingInfoList-r15        Gen-SchedulingInfoList-r15,
    si-genWindowLength                ENUMERATED {
                                      ms1, ms2, ms5, ms10, ms15, ms20,
                                      ms40},
    si-genOffset-r15                  ENUMERATED   OPTIONAL, -- Need
                                      {true}
OP
    si-noOfGenSiMessagesPerSiWindow-r15    INTEGER (1..8)  OPTIONAL, -- Need
OP
    si-genSiMessageInLegacy-r15       ENUMERATED   OPTIONAL, -- Need
                                      {true}
OP
    nonCriticalExtension              SEQUENCE { }   OPTIONAL
}
PLMN-IdentityList ::=                 SEQUENCE (SIZE (1..maxPLMN-r11)) OF PLMN-
IdentityInfo
PLMN-IdentityInfo ::=                 SEQUENCE {
    plmn-Identity                     PLMN-Identity,
    cellReservedForOperatorUse        ENUMERATED {reserved, notReserved}
}
SchedulingInfoList ::= SEQUENCE (SIZE (1..maxSI-Message)) OF SchedulingInfo
SchedulingInfo ::= SEQUENCE {
    si-Periodicity                    ENUMERATED {
                                      rf8, rf16, rf32, rf64, rf128, rf256, rf512},
    sib-MappingInfo                   SIB-MappingInfo
}
SchedulingInfoList-BR-r13 ::= SEQUENCE (SIZE (1..maxSI-Message)) OF SchedulingInfo-BR-r13
SchedulingInfo-BR-r13 ::= SEQUENCE {
    si-Narrowband-r13                 INTEGER (1..maxAvailNarrowBands-r13),
    si-TBS-r13                        ENUMERATED {b152, b208, b256, b328, b408, b504, b600,
b712,
                                      b808, b936}
}
SIB-MappingInfo ::= SEQUENCE (SIZE (0..maxSIB-1)) OF SIB-Type
SIB-Type ::=                          ENUMERATED {
                                      sibType3, sibType4, sibType5, sibType6,
                                      sibType7, sibType8, sibType9, sibType10,
                                      sibType11, sibType12-v920, sibType13-v920,
                                      sibType14-v1130, sibType15-v1130,
                                      sibType16-v1130, sibType17-v1250, sibType18-v1250,
                                      ..., sibType19-v1250, sibType20-v1310, sibType21-
v1430}
SystemInfoValueTagList-r13 ::=        SEQUENCE (SIZE (1..maxSI-Message)) OF
SystemInfoValueTagSI-r13
SystemInfoValueTagSI-r13 ::=          INTEGER (0..3)
CellSelectionInfo-v920 ::=            SEQUENCE {
    q-QualMin-r9                      Q-QualMin-r9,
    q-QualMinOffset-r9                INTEGER (1..8)   OPTIONAL  --
Need OP
}
CellSelectionInfo-v1130 ::=           SEQUENCE {
    q-QualMinWB-r11                   Q-QualMin-r9
}
CellSelectionInfo-v1250 ::=           SEQUENCE {
    q-QualMinRSRQ-OnAllSymbols-r12    Q-QualMin-r9
}
CellAccessRelatedInfo-r14 ::= SEQUENCE {
    plmn-IdentityList-r14             PLMN-IdentityList,
    trackingAreaCode-r14              TrackingAreaCode,
    cellIdentity-r14                  CellIdentity
}
Gen-SchedulingInfoList-r15 ::= SEQUENCE (SIZE (1..maxGenSI-Message)) OF Gen-SchedulingInfo-
r15
Pos-SchedulingInfo-r15 ::= SEQUENCE {
    gen-si-Periodicity-r15            ENUMERATED {rf8, rf16, rf32, rf64, rf128, rf256, rf512 },
    gen-sib-MappingInfo-r15           Gen-SIB-MappingInfo-r15
}
Gen-SIB- MappingInfo-r15 ::= SEQUENCE (SIZE (1..maxSIB)) OF GenSIB-Type-r15
Gen-SIB-Type-r15 ::= SEQUENCE {
    gen-SIB-ElementType-r15           Gen-SIB-ElementType-r15,
    gen-SIB-MetaData-r15              Gen-SIB-MetaData-   OPTIONAL,   --
                                      r15
Need OP
```

| SystemInformationBlockType1 message | | | |
|---|---|---|---|
| encryptionKeyIndex-r15 | INTEGER(0..16) | OPTIONAL, | -- Need OP |

```
}
Gen-SIB-MetaData-r15 ::= CHOICE {
  gnss-SIB-MetaData-r15    Gnss-SIB-MetaData-r15,
  ...
}
Gnss-SIB-MetaData-r15 ::= {
  gnss-id-r15              GNSS-ID-r15          OPTIONAL,   -- Need OP
  sbas-id-r15              SBAS-ID-r15          OPTIONAL,   -- Need OP
}
-- ASN1STOP
```

In the exemplary *SystemInformation BlockType1 message* given above, the posSchedulingInfoList given by Pos-SchedulingInfo-r15 gives the periodicity of the pSIMs and how the pSIMs are compiled. For example, the gen-si-Periodicity-r15 is the periodicity of the pSIM in 10 ms radio frames so that rf8 means 80 ms, rf16 means 160 ms, rf 32 means 320 ms, etc. Further, the gen-sib-MappingInfo-r15 info tells how the pSIMs are compiled to comprise one or more pSIBs, i.e. to comprise one to maxSIB number.

Further Extensions and Variations

Figure 9:
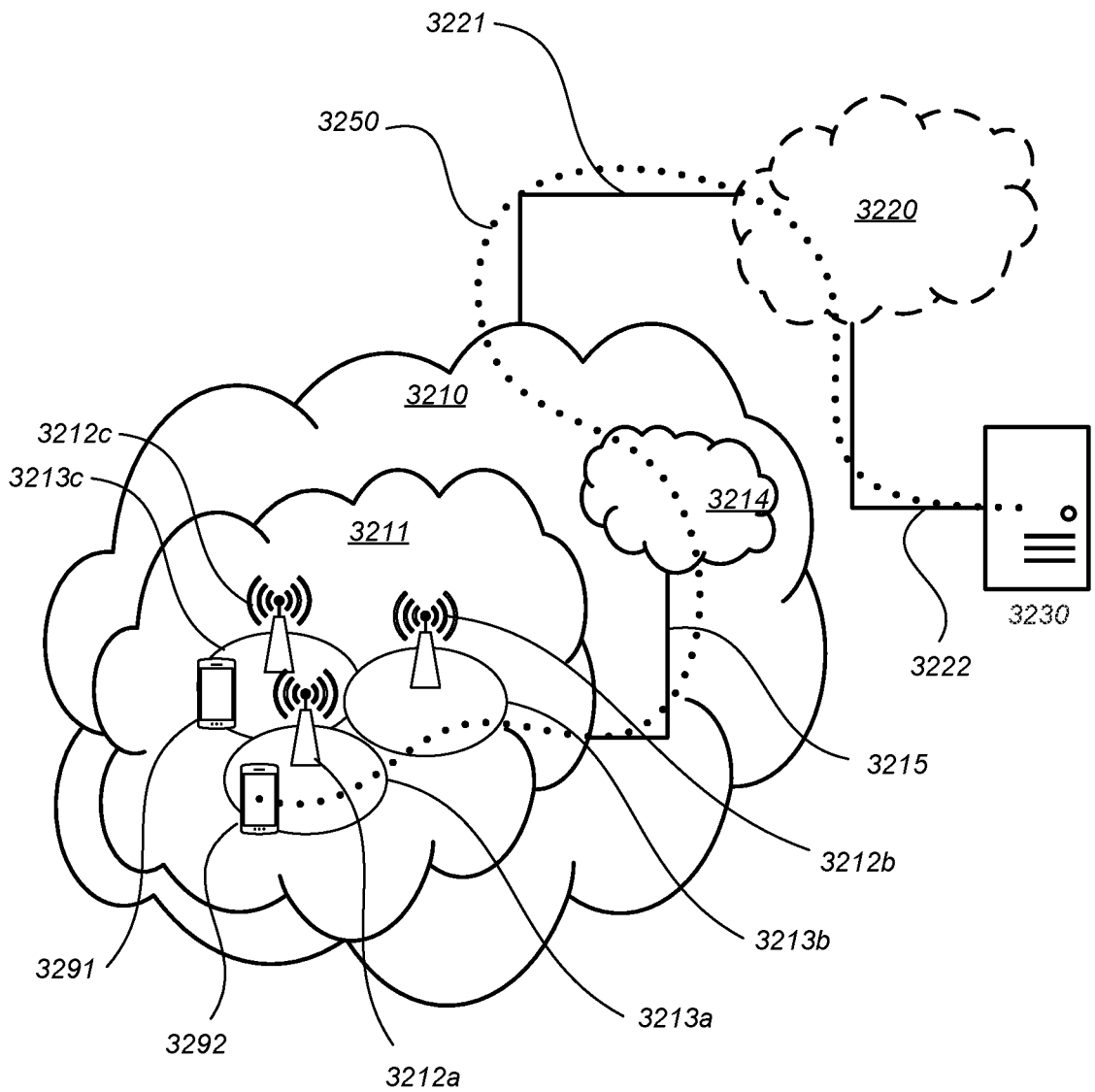
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 20, 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 10, 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 19) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
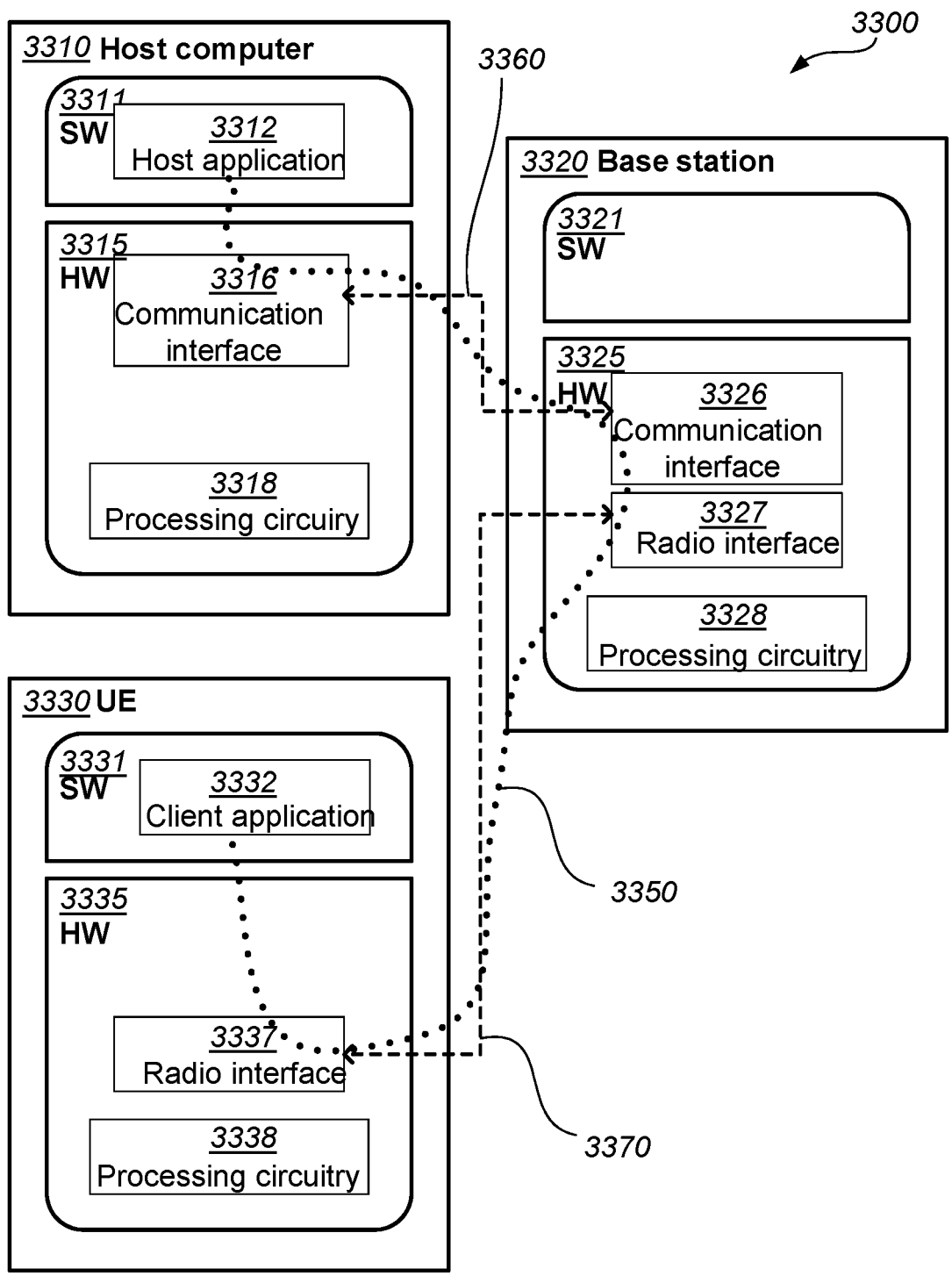
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
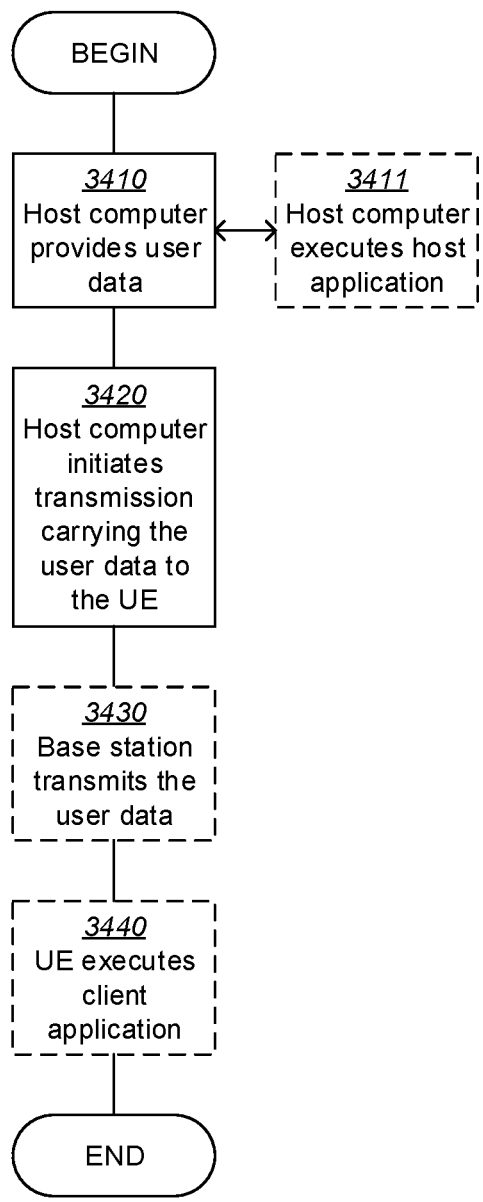
FIGS. 11-14 are flowcharts illustrating methods implemented in a communication system including a host computer, a base station and a user equipment.
Figure 12:
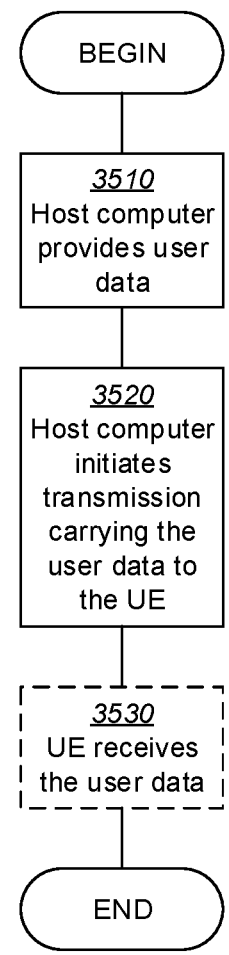

FIGS. 9 and 10 and the corresponding text are about a downstream aspect of the radio-related invention, while FIGS. 11 and 12 and the corresponding text discuss an upstream aspect.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 13:
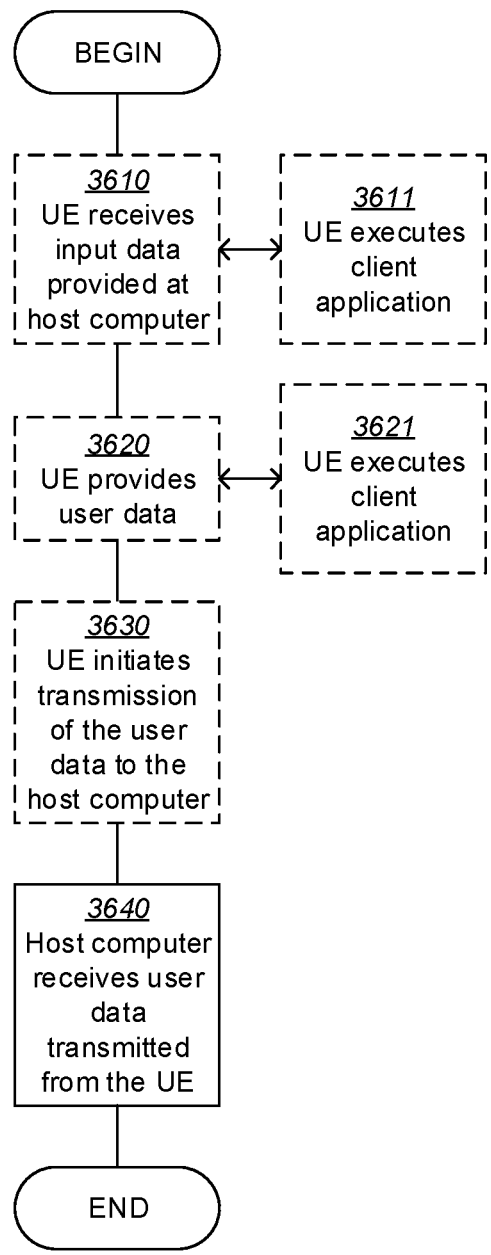

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 14:
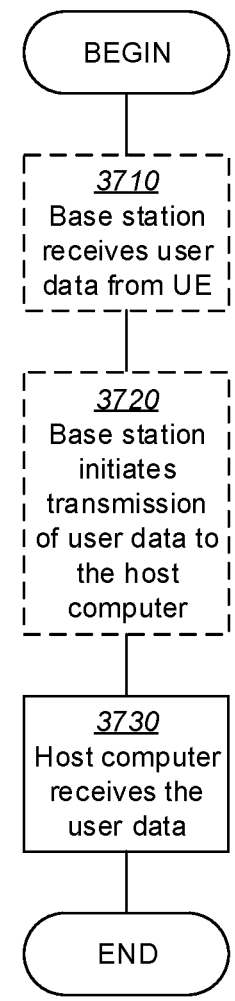

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 9 and 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data cared in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| RTK | Real Time Kinematics |
| AD | Assistance Data |
| NN | Network Node |
| E-SMLC | Evolved Serving Mobile Location Center |
| LMF | Location Management Function |
| MNN | Mobility Network Node |
| MME | Mobility Management Entity |
| AMF | Access and Mobility Function |
| RNN | Radio Network Node |
| UE | User Equipment |
| OTDOA | Observed Time Difference of Arrival |
| SIB | System Information Block |
| pSIB | Positioning System Information Block |
| pSI | positioning system information block Scheduling Information |

-continued

| Abbreviation | Explanation |
| --- | --- |
| RRC | Radio Resource Control |
| GPS | Global Positioning System |
| GNSS | Global Navigation Satellite System |

Numbered Example Embodiments

US1. A wireless device for receiving scheduled positioning system information from a radio network node, wherein the wireless device comprises a processor and a memory, said memory containing instructions executable by said processor whereby the wireless device is operative to:
    receive positioning system information scheduling information, pSI, from the radio network node;
    receive, from the radio network node, at least one out of:
        a scheduling offset; and
        a number of system information messages with positioning system information blocks, pSIMs, per SI window;
    determine in which subframes one or more pSIMs are scheduled by the radio network node based on the pSI and based on at least one out of:
        the scheduling offset; and
        the number of pSIMs per SI window; and
    use the determined scheduling of the one or more pSIMs for receiving the one or more pSIMs.

US2. The wireless device of US1, further being operative to:
    decode the information of the received one or more pSIMs and using the decoded information to assist positioning of the wireless device.

US3. The wireless device of US1 or US2, wherein the wireless device is operative to determine in which subframes the one or more pSIMs are scheduled based on the pSI and the scheduling offset by further being operative to:
    determine a start subframe number a for a pSIM as a=x mod 10 in a radio frame for which SFN mod T=Floor (x/10)+8, wherein SFN is a subframe number, T is an SI periodicity of the pSIM, 8 is indicated by the scheduling offset and x is an integer value given by x=m*wm+(n−1)*wn, wherein m is a number of SI messages, wm is a window length of the SI message, n gives an order of entry in the list of pSIMs and is given by the pSI, and wn is a window length of the pSIM.

US4. The wireless device of any one of US1-US3, wherein the scheduling offset is an indication of a shifted starting position.

US5. The wireless device of any one of US1-US3, wherein the scheduling offset is equal to an SI periodicity.

US6. The wireless device of US5, wherein the SI periodicity is 8 subframes.

US7. The wireless device of US1 or US2, wherein the wireless device is operative to determine in which subframes the one or more pSIMs are scheduled based on the pSI and the scheduling offset by further being operative to:
    determine a start subframe number a for a pSIM as a=x mod 10 in a radio frame for which SFN mod T=Floor (x/10), wherein SFN is a subframe number, T is an SI periodicity of the pSIM, and x is an integer value given by x=FLOOR((n−1)/c)*wn, wherein n gives an order of entry in the list of pSIMs and is given by the pSI, c is the number of pSIMs scheduled per SI window, and wn is a window length of the pSIM.

US8. The wireless device of any one of US1-US7, wherein the each pSIM comprises one or more positioning System Information Blocks, pSIBs, and wherein each pSIB comprises one or more segments of positioning assistance data.

US9. The wireless device of US8, wherein the pSI comprises one or more out of:
- a Global Navigation Satellite System identity, GNSS ID, per pSIB type; and
- an indication of whether or not the one or more pSIBs of each pSIM is encrypted.

US10. The wireless device of any one of US1-US9, wherein the number of pSIMs per SI window indicates the number of PSIMs scheduled after a SI message in an SI window.

US11. A radio network node for transmitting scheduled positioning system information to a wireless device, wherein the radio network node comprises a processor and a memory, said memory containing instructions executable by said processor whereby said radio network node is operative to:
- obtain one or more positioning System Information Blocks, pSIBs;
- compile one or more system information message with positioning system information blocks, pSIM, to comprise one or more pSIBs;
- determine positioning system information scheduling information, pSI, of the one or more pSIMs in consideration of at least one out of a scheduling offset and a number of pSIMs per SI window;
- broadcast the determined pSI of the one or more pSIMs and the at least one out of the scheduling offset and the number of pSIMs; and
- schedule and transmit the one or more pSIMs according to the determined pSI.

US12. The radio network node of US11, wherein the pSI comprises one or more out of:
- a Global Navigation Satellite System identity, GNSS ID, per pSIB type; and
- an indication of whether or not the one or more pSIBs of each pSIM is encrypted.

US13. The radio network node of US11 or US12, wherein each pSIB comprises one or more segments of positioning assistance data.

US14. The radio network node of any one of US11-US13, wherein the scheduling offset is an indication of a shifted starting position.

US15. The radio network node of any one of US11-US13, wherein the scheduling offset is equal to an SI periodicity.

US16. The radio network node of US15, wherein the wherein the SI periodicity is 8 subframes.

US17. The radio network node of any one of US11-US16, wherein the number of pSIMs per SI window indicates the number of pSIMs scheduled after an SI message in an SI window.

CN1. A wireless device (10, 120) for receiving scheduled positioning system information from a radio network node, and wherein the wireless device comprises:
- a receiving unit configured to receive positioning system information scheduling information, pSI, from the radio network node (20, 110);
- wherein the receiving unit further is configured to receive, from the radio network node (20, 110), at least one out of:
  - a scheduling offset; and
  - a number of system information messages with positioning system information blocks, pSIMs, per SI window;
- a determining unit configured to determine in which subframes one or more pSIMs are scheduled by the radio network node (20, 110) based on the pSI and based on at least one out of:
  - the scheduling offset; and
  - the number of pSIMs per SI window; and configured to:
- wherein the receiving unit is configured to use the determined scheduling of the one or more pSIMs for receiving the one or more pSIMs.

CN2. The wireless device (10, 120) of CN1, further comprising:
- a decoding unit configured to decode the information of the received one or more pSIMs and to use the decoded information to assist positioning of the wireless device (10, 120).

CN3. The wireless device (10, 120) of CN1 or CN2, wherein the determining unit is configured to determine in which subframes the one or more pSIMs are scheduled based on the pSI and the scheduling offset by further being configured to:
- determine a start subframe number a for a pSIM as a=x mod 10 in a radio frame for which SFN mod T=Floor (x/10)+8, wherein SFN is a subframe number, T is an SI periodicity of the pSIM, 8 is indicated by the scheduling offset and x is an integer value given by x=m*wm+(n−1)*wn, wherein m is a number of SI messages, wm is a window length of the SI message, n gives an order of entry in the list of pSIMs and is given by the pSI, and wn is a window length of the pSIM.

CN4. The wireless device (10, 120) of any one of CN1-CN3, wherein the scheduling offset is an indication of a shifted starting position.

CN5. The wireless device (10, 120) of any one of CN1-CN3, wherein the scheduling offset is equal to an SI periodicity.

CN6. The wireless device (10, 120) of CN5, wherein the SI periodicity is 8 subframes.

CN7. The wireless device (10, 120) of CN1 or CN2, wherein the determining unit is configured to determine in which subframes the one or more pSIMs are scheduled based on the pSI and the number of pSIMs per SI window by further being configured to:
- determine a start subframe number a for a pSIM as a=x mod 10 in a radio frame for which SFN mod T=Floor (x/10), wherein SFN is a subframe number, T is an SI periodicity of the pSIM, and x is an integer value given by x=FLOOR((n−1)/c)*wn, wherein n gives an order of entry in the list of pSIMs and is given by the pSI, c is the number of pSIMs scheduled per SI window, and wn is a window length of the pSIM.

CN8. The wireless device (10, 120) of any one of CN1-CN7, wherein each pSIM comprises one or more positioning System Information Blocks, pSIBs, and wherein each pSIB comprises one or more segments of positioning assistance data.

CN9. The wireless device (10, 120) of CN8, wherein the pSI comprises one or more out of:
- a Global Navigation Satellite System identity, GNSS ID, per pSIB type; and
- an indication of whether or not the one or more pSIBs of each pSIM is encrypted.

CN10. The wireless device (10, 120) of any one of CN1-CN9, wherein the number of pSIMs per SI window indicates the number of PSIMs scheduled after a SI message in an SI window CN11. A radio network node (20, 110) for transmitting scheduled positioning system information to a wireless device (10, 120), wherein the radio network node (20, 110) comprises:
   an obtaining unit configured to obtain one or more positioning System Information Blocks, pSIBs;
   a compiling unit configured to compile one or more system information message with positioning system information blocks, pSIM, to comprise one or more pSIBs;
   a determining unit configured to determine positioning system information scheduling information, pSI, of the one or more pSIMs in consideration of at least one out of a scheduling offset and a number of pSIMs per SI window;
   a transmitting unit and/or a broadcasting unit configured to broadcast the determined pSI of the one or more pSIMs and the at least one out of the scheduling offset and the number of pSIMs; and
   a scheduling unit configured to schedule the one or more pSIMs according to the determined pSI and a transmitting unit configured to transmit the one or more pSIMs according to the determined pSI.

CN12. The radio network node (20, 110) of CN11, wherein the pSI comprises one or more out of:
   a Global Navigation Satellite System identity, GNSS ID, per pSIB type; and
   an indication of whether or not the one or more pSIBs of each pSIM is encrypted.

CN13. The radio network node (20, 110) of CN11 or CN12, wherein each pSIB comprises one or more segments of positioning assistance data.

CN14. The radio network node (20, 110) of any one of CN11-CN13, wherein the scheduling offset is an indication of a shifted starting position.

CN15. The radio network node (20, 110) of any one of CN11-CN13, wherein the scheduling offset is equal to an SI periodicity.

CN16. The radio network node (20, 110) of CN15, wherein the SI periodicity is 8 subframes.

CN17. The radio network node (20, 110) of any one of CN11-CN16, wherein the number of pSIMs per SI window indicates the number of pSIMs scheduled after an SI message in an SI window.

The invention claimed is:

1. A wireless device configured to receive positioning system information from a radio network node, the wireless device comprising a processor and a memory, the memory containing instructions executable by the processor to configure the wireless device to:
   receive positioning system information scheduling information (pSI) from the radio network node;
   receive, from the radio network node,
      a scheduling offset;
   determine in which subframes at least one system information message with positioning system information blocks (pSIM) is scheduled by the radio network node based on
      the scheduling offset, a start subframe number a for a pSIM being determined as a=x mod 10 in a radio frame for which SFN mod T=Floor (x/10)+8, SFN being a system frame number, T being a system information (SI) periodicity of the pSIM, 8 being indicated by the scheduling offset and x being an integer value given by x=m*wm+(n−1*wn, m being a number of SI messages, wm being a window length of an SI message, n giving an order of entry in the list of pSIMs and being given by the pSI, and wn being a window length of the pSIM; and
   use the determined scheduling of the at least one pSIM for receiving the at least one pSIM.

2. The wireless device of claim 1, the memory containing instructions executable by said processor to configure the wireless device to:
   decode information of the received at least one pSIM; and
   use the decoded information to assist positioning of the wireless device.

3. The wireless device of claim 1, wherein the scheduling offset is an indication of a shifted starting position.

4. The wireless device of claim 1, wherein the scheduling offset is equal to an SI periodicity.

5. The wireless device of claim 4, wherein the SI periodicity is 8 subframes.

6. The wireless device of claim 1, wherein each pSIM of the at least one pSIM comprises one or more at least one positioning System Information Block (pSIB), and wherein each pSIB comprises at least one segment of positioning assistance data.

7. The wireless device of claim 6, wherein the pSI comprises at least one of:
   a Global Navigation Satellite System identity (GNSS ID) per pSIB type; and
   an indication of whether each pSIM is encrypted.

8. A method performed by a wireless device for receiving positioning system information from a radio network node, the method comprising:
   receiving positioning system information scheduling information (pSI) from the radio network node;
   receiving, from the radio network node, at least one out of:
      a scheduling offset; and
   determining in which subframes at least one system information message with positioning system information blocks (pSIM) is scheduled by the radio network node based on the pSI and based on
      the scheduling offset, a start subframe number a for a pSIM being determined as a=x mod 10 in a radio frame for which SFN mod T Floor (x/10)+8, SFN being a system frame number, T being a system information (SI) periodicity of the pSIM, 8 being indicated by the scheduling offset and x being an integer value given by x=m*wm+(n−1)*wn, m being a number of SI messages, wm being a window length of an SI message, n giving an order of entry in the list of pSIMs and being given by the pSI, and wn being a window length of the pSIM; and
   using the determined scheduling of the at least one pSIM for receiving the at least one pSIM.

9. The method of claim 8, further comprising:
   decoding information of the received at least one pSIM; and
   using the decoded information to assist positioning of the wireless device.

10. The method of claim 8, wherein the scheduling offset is an indication of a shifted starting position.

11. The method of claim 8, wherein the scheduling offset is equal to an SI periodicity.

12. The method of claim 11, wherein the SI periodicity is 8 subframes.

13. The method of claim 8, wherein each pSIM of the at least one pSIM comprises at least one positioning System Information Block (pSIB), and wherein each pSIB comprises at least one segment of positioning assistance data.

14. The method of claim 8, wherein the pSI comprises at least one of:
- a Global Navigation Satellite System identity (GNSS ID) per pSIB type; and
- an indication of whether each pSIM is encrypted.

* * * * *